United States Patent
Kimura et al.

(10) Patent No.: US 12,285,739 B2
(45) Date of Patent: Apr. 29, 2025

(54) WATER ABSORBENT AGENT AND METHOD FOR PRODUCING WATER ABSORBENT AGENT

(71) Applicant: NIPPON SHOKUBAI CO., LTD., Osaka (JP)

(72) Inventors: Kazuki Kimura, Himeji (JP); Reiko Nakatsuru, Himeji (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 842 days.

(21) Appl. No.: 17/421,790

(22) PCT Filed: Jan. 10, 2020

(86) PCT No.: PCT/JP2020/000645
§ 371 (c)(1),
(2) Date: Jul. 9, 2021

(87) PCT Pub. No.: WO2020/145383
PCT Pub. Date: Jul. 16, 2020

(65) Prior Publication Data
US 2022/0088568 A1    Mar. 24, 2022

(30) Foreign Application Priority Data
Jan. 11, 2019    (JP) .................... 2019-003361

(51) Int. Cl.
*B01J 20/26* (2006.01)
*B01J 20/28* (2006.01)
*B01J 20/30* (2006.01)

(52) U.S. Cl.
CPC .......... *B01J 20/267* (2013.01); *B01J 20/261* (2013.01); *B01J 20/28004* (2013.01); *B01J 20/28016* (2013.01); *B01J 20/28047* (2013.01); *B01J 20/28059* (2013.01); *B01J 20/3021* (2013.01); *B01J 20/3085* (2013.01); *B01J 2220/46* (2013.01)

(58) Field of Classification Search
None
See application file for complete search history.

(56) References Cited

U.S. PATENT DOCUMENTS

| | | |
|---|---|---|
| 4,693,713 A | 9/1987 | Chmelir et al. |
| 4,734,478 A | 3/1988 | Tsubakimoto et al. |
| 4,863,989 A | 9/1989 | Obayashi et al. |
| 4,959,060 A | 9/1990 | Shimomura et al. |
| 4,972,019 A | 11/1990 | Obayashi et al. |
| 4,985,514 A | 1/1991 | Kimura et al. |
| 5,229,488 A | 7/1993 | Nagasuna et al. |
| 5,369,148 A | 11/1994 | Takahashi et al. |
| 5,597,873 A | 1/1997 | Chambers et al. |
| 5,681,878 A | 10/1997 | Klotzsche et al. |
| 5,728,742 A | 3/1998 | Staples et al. |
| 5,840,321 A | 11/1998 | Engelhardt et al. |
| 5,994,440 A | 11/1999 | Staples et al. |
| 6,090,875 A | 7/2000 | Staples et al. |
| 2004/0077796 A1 | 4/2004 | Daniel et al. |
| 2004/0106745 A1 | 6/2004 | Nakashima et al. |
| 2005/0085604 A1 | 4/2005 | Handa et al. |
| 2005/0288182 A1 | 12/2005 | Torii et al. |
| 2006/0073969 A1 | 4/2006 | Torii et al. |
| 2006/0074160 A1 | 4/2006 | Handa et al. |
| 2006/0183828 A1 | 8/2006 | Dairoku et al. |
| 2006/0204755 A1 | 9/2006 | Torii et al. |
| 2007/0066754 A1 | 3/2007 | Loeker et al. |
| 2007/0106239 A1 | 5/2007 | Riegel et al. |
| 2007/0111004 A1 | 5/2007 | Handa et al. |
| 2007/0239124 A1 | 10/2007 | Handa et al. |
| 2008/0221277 A1 | 9/2008 | Walden et al. |
| 2008/0280128 A1 | 11/2008 | Furno et al. |
| 2009/0105389 A1 | 4/2009 | Walden et al. |
| 2009/0202805 A1 | 8/2009 | Furno et al. |
| 2009/0227741 A1 | 9/2009 | Walden et al. |
| 2010/0062252 A1 | 3/2010 | Kimura et al. |
| 2011/0015601 A1 | 1/2011 | Loeker et al. |
| 2013/0001468 A1 | 1/2013 | Loeker et al. |
| 2014/0031473 A1* | 1/2014 | Nogi .............. C08F 20/06 525/383 |
| 2014/0193641 A1 | 7/2014 | Torii et al. |

(Continued)

FOREIGN PATENT DOCUMENTS

| | | |
|---|---|---|
| EP | 0249391 A2 | 12/1987 |
| EP | 0679678 A2 | 11/1995 |

(Continued)

OTHER PUBLICATIONS

Japanese Office Action dated Jun. 21, 2022, which issued in the corresponding Japanese Patent Application No. 2020-565223, including English machine translation.
Chinese Office Action dated Feb. 6, 2024, which issued in the corresponding Chinese Patent Application No. 202080008729.7, including English translation.
International Search Report dated Mar. 24, 2020, issued in the corresponding PCT Patent Application No. PCT/JP2020/000645, including English Translation.
Extended European Search Report dated Aug. 31, 2022, which issued in the corresponding European Patent Application No. 20738223.5.

(Continued)

*Primary Examiner* — Tanisha Diggs
(74) *Attorney, Agent, or Firm* — Dickinson Wright PLLC

(57) ABSTRACT

The present invention provides an easy method for producing a water absorbent agent that has a low moisture content and that has a small dust generation amount without decreasing various physical properties. A present inventive method for producing a water absorbent agent of the present invention includes mixing not lower than 0.06 parts by mass and not higher than 5 parts by mass of an inorganic acid alkali metal salt powder with 100 parts by mass of a water-absorbent resin in an indefinite ground form.

15 Claims, No Drawings

(56) References Cited

U.S. PATENT DOCUMENTS

| | | | |
|---|---|---|---|
| 2014/0350191 A1 | 11/2014 | Walden et al. | |
| 2015/0218341 A1* | 8/2015 | Nakashima | A61L 26/008 524/349 |
| 2015/0258237 A1 | 9/2015 | Machida et al. | |
| 2018/0298132 A1* | 10/2018 | Yorino | C08K 5/175 |
| 2019/0125921 A1 | 5/2019 | Kimura et al. | |

FOREIGN PATENT DOCUMENTS

| | | |
|---|---|---|
| EP | 0755964 A2 | 1/1997 |
| EP | 0926499 A1 | 6/1999 |
| EP | 1616581 A1 | 1/2006 |
| JP | S6339934 A | 2/1988 |
| JP | S63272349 A | 11/1988 |
| JP | H01131209 A | 5/1989 |
| JP | H06298841 A | 10/1994 |
| JP | 2006297373 A | 11/2006 |
| WO | 9103497 A1 | 3/1991 |
| WO | 9117200 A1 | 11/1991 |
| WO | 9422940 A1 | 10/1994 |
| WO | 9527739 A1 | 10/1995 |
| WO | 9730109 A1 | 8/1997 |
| WO | 9737695 A1 | 10/1997 |
| WO | 9804922 A1 | 2/1998 |
| WO | 02060983 A2 | 8/2002 |
| WO | 02100451 A2 | 12/2002 |
| WO | 03059962 A1 | 7/2003 |
| WO | 2004061010 A1 | 7/2004 |
| WO | WO2004069293 A1 | 8/2004 |
| WO | 2005005549 A1 | 1/2005 |
| WO | 2005011860 A2 | 2/2005 |
| WO | 2005061014 A1 | 7/2005 |
| WO | 2006088115 A1 | 8/2006 |
| WO | 2007121941 A2 | 11/2007 |
| WO | 2013002387 A1 | 1/2013 |
| WO | WO2014034667 A1 | 3/2014 |
| WO | 2014054656 A1 | 4/2014 |
| WO | 2017170501 A1 | 10/2017 |

OTHER PUBLICATIONS

Chinese Office Action dated Aug. 24, 2023, which issued in the corresponding Chinese Patent Application No. 202080008729.7, including English translation.

Chinese Office Action dated Feb. 16, 2023, which issued in the corresponding Chinese Patent Application No. 202080008729.7, including English translation.

European Office Action dated Jan. 29, 2025, which issued in the corresponding European Patent Application No. 20 738 223.5.

* cited by examiner

WATER ABSORBENT AGENT AND METHOD FOR PRODUCING WATER ABSORBENT AGENT

TECHNICAL FIELD

The present invention relates to a water absorbent agent and a method for producing a water absorbent agent.

BACKGROUND ART

Water absorbent agents made by using water-absorbent resins are widely used for hygienic materials such as disposable diapers, sanitary napkins, and so-called incontinence pads for the purpose of absorbing body fluids. Various monomers and hydrophilic macromolecules are used as raw materials of the water-absorbent resins. Especially, polyacrylic acid (salt)-based water-absorbent resins made by using acrylic acid and/or a salt thereof (hereinafter, written as "acrylic acid (salt)") as a monomer are generally used.

As physical properties of the above water-absorbent resins, absorption capacity, absorption capacity under load, water-soluble content, particle size, and the like are defined in the Worldwide Strategic Partners (WSP) standards and the EDANA Recommended Test (ERT) methods. Dust amount is defined as one of the physical properties (Non-Patent Literatures 1 and 2).

It has been known that a crosslinked polymer in the form of a hydrous gel (hereinafter, referred to as a "hydrous gel") or a water-absorbent resin is worn and damaged at the time of treatment or transfer between steps in a manufacturing process for a water absorbent agent so that dust generated owing to the wear and the damage floats and causes a working environment to deteriorate.

As methods for decreasing the above dust amount, the following techniques have been proposed to date. Specifically, known techniques are: techniques in which water is added to a water-absorbent resin as a binder for fine powder or dust in the water-absorbent resin (Patent Literatures 1 and 2); techniques in which a surfactant is added (Patent Literatures 3 to 5); a technique in which a dendrimer is added (Patent Literature 6); a technique in which a polysiloxane and a polyol are added (Patent Literature 7); a technique in which a poly-alkyne glycol is added (Patent Literature 8); a technique in which a thermoplastic adhesive is added (Patent Literature 9); a technique in which a hydrophilic macromolecule and a stabilizing agent are added (Patent Literature 10); a technique in which a water-absorbent resin is coated with a wax (Patent Literature 11); a technique in which a C3-C6 diol is added (Patent Literature 12); a technique in which a hydrotalcite is added (Patent Literature 13); a technique in which a urea and a polyvalent metal salt are added (Patent Literature 14); a technique in which a polyvalent metal salt such as alum is fused to a water-absorbent resin (Patent Literature 15); and a technique in which a mixture of an inorganic powder and an oxyalkylene ether is used (Patent Literature 16).

In addition, it has been known to use reducing inorganic acid alkali metal salts for the purpose of decreasing residual monomers and preventing coloring or degradation in order to improve physical properties other than the above dust amount of water-absorbent resins (Patent Literatures 17 to 22). Moreover, it has been known to use non-reducing inorganic acid alkali metal salts, as neutralizers for acid groups in water-absorbent resins (Patent Literatures 23 and 24) and mixing aids for surface-crosslinking agent aqueous solutions (Patent Literatures 25 and 26). Further, it has been known to use an inorganic acid alkali metal salt as a blood absorption improver (Patent Literature 27). Furthermore, a technique has also been known in which a water-insoluble polyvalent metal salt is mixed with a water-absorbent resin for the purpose of anti-caking and improvement in the liquid permeability of the above water-absorbent resin (Patent Literature 28).

CITATION LIST

Patent Literature

[PTL 1] U.S. Pat. No. 4,734,478
[PTL 2] International Publication No. 1991/017200
[PTL 3] International Publication No. 1994/022940
[PTL 4] International Publication No. 1997/030109
[PTL 5] International Publication No. 1997/037695
[PTL 6] International Publication No. 2005/061014
[PTL 7] European Patent No. 0679678
[PTL 8] International Publication No. 2007/121941
[PTL 9] International Publication No. 2005/011860
[PTL 10] International Publication No. 2014/034667
[PTL 11] European Publication No. 0755964
[PTL 12] International Publication No. 1995/027739
[PTL 13] International Publication No. 2014/054656
[PTL 14] European Publication No. 1616581
[PTL 15] International Publication No. 2004/069293
[PTL 16] Japanese Laid-Open Patent Publication No. S63-039934
[PTL 17] European Publication No. 0249391
[PTL 18] International Publication No. 1991/03497
[PTL 19] International Publication No. 2004/061010
[PTL 20] International Publication No. 2005/005549
[PTL 21] International Publication No. 2003/059962
[PTL 22] International Publication No. 2006/088115
[PTL 23] Japanese Laid-Open Patent Publication No. H01-131209
[PTL 24] Japanese Laid-Open Patent Publication No. H06-298841
[PTL 25] International Publication No. 2002/100451
[PTL 26] International Publication No. 1998/004922
[PTL 27] U.S. Pat. No. 4,693,713
[PTL 28] International Publication No. 2002/060983

Non Patent Literature

[Non-PTL 1] WSP 280.2 and 290.2
[Non-PTL 2] EDANA ERT 480.2 (02) and 490.2 (02)

SUMMARY OF THE INVENTION

Problems to be Solved by the Invention

The methods for decreasing dust proposed in the above Patent Literatures 1 to 16 can each suppress generation of dust. Meanwhile, problems arise in that, for example, water absorption performance decreases and cost for raw materials increases. Specifically, in each of the above Patent Literatures 1 and 2, increase in the moisture content of the water-absorbent resin in a manufacturing process enables suppression of generation of dust, but the increase in the moisture content leads to decrease in the proportion of a water-absorbent resin component contributing to water absorption, whereby a problem arises in that the water absorption performance decreases. In addition, in Patent Literatures 3 to 16, various additives enable suppression of generation of dust, but problems arise in that: surfactants, water-soluble polymers, water-insoluble polymers, and the like lead to decrease in a surface tension; waxes, thermally fusible adhesives, and the like lead to elongation of a water absorption time; and polyvalent metal salts lead to decrease in an absorption capacity under load, a urine resistance, and coloring over time. Further, many of these additives have high viscosities, and a problem arises in that it is difficult to evenly mix such additives with the water-absorbent resins.

Considering this, the present inventors studied factors of generation of dust and have found that, since a water absorbent agent obtained in the present invention contains a water-absorbent resin in an indefinite ground form as a main component, an end portion of the water-absorbent resin is easily chipped owing to wear or the like in a manufacturing process, resulting in generation of dust. The present inventors have found that: the moisture content of the water-absorbent resin influences a dust generation amount; and a lower moisture content leads to a more prominent increase in the dust generation amount. In addition, the present inventors have also found that: the magnitude of the specific surface area of the water-absorbent resin also influences the dust generation amount; and a higher specific surface area leads to a more prominent increase in the generation amount.

Meanwhile, each of the above Patent Literatures 17 to 27 discloses using an inorganic acid alkali metal salt for the purpose of decreasing in a residual monomer and the like, and does not disclose or suggest using the inorganic acid alkali metal salt for the purpose of decreasing dust. Further, in Patent Literature 28, use of a water-insoluble polyvalent metal salt powder poses a problem that the dust amount increases.

The present invention has been made in view of the above problems and solves the problem of dust in a water-absorbent resin in an indefinite ground form. Further, an object of the present invention is to provide: an easy method for inexpensively producing a water absorbent agent that has a low moisture content and that has a small dust generation amount without decreasing various physical properties such as a surface tension; and the water absorbent agent.

Solution to the Problems

In each of the conventional dust decrease techniques, dust is decreased or immobilized by using water, a liquid binder, a binder solution in solid state at normal temperature, or a melted liquid. Meanwhile, the present invention is characterized by adding a powder of an inorganic acid alkali metal salt to a water-absorbent resin. It has been found that use of the powder of the inorganic acid alkali metal salt enables specific decrease in a dust amount without decreasing the surface tension or physical properties of the water-absorbent resin. Consequently, the present invention has been completed.

A gist of a method for producing a water absorbent agent of the present invention which can solve the above problem, is mixing not lower than 0.06 parts by mass and not higher than 5 parts by mass of an inorganic acid alkali metal salt powder with 100 parts by mass of a water-absorbent resin in an indefinite ground form.

The preferable embodiment of the present inventive production method includes at least one selected from the group consisting of following (A) to (J), and following (A) to (J) can be arbitrarily selected.
(A) Moisture content of the water-absorbent resin is not higher than 10% by mass.
(B) Specific surface area of the water-absorbent resin is not lower than 25 $m^2/kg$ and proportion of particles of the water-absorbent resin that pass through sieve having mesh opening size of 150 μm to entire water-absorbent resin is not higher than 3% by mass.
(C) The water-absorbent resin is a polyacrylic acid (salt)-based water-absorbent resin obtained by performing foaming polymerization on a monomer aqueous solution containing an acrylic acid (salt) as a main component.
(D) The water-absorbent resin is a polyacrylic acid (salt)-based water-absorbent resin obtained through a step of performing gel grinding, at a gel grinding energy 2 not lower than 7 J/g and not higher than 40 J/g, on a crosslinked polymer in the form of a hydrous gel which is obtained simultaneously with or after polymerization of a monomer aqueous solution containing an acrylic acid (salt) as a main component.
(E) The water-absorbent resin is a polyacrylic acid (salt)-based water-absorbent resin obtained through a step of granulating a crosslinked polymer in the form of a hydrous gel or a dried substance thereof, the crosslinked polymer having been obtained simultaneously with or after polymerization of a monomer aqueous solution containing an acrylic acid (salt) as a main component.
(F) The water-absorbent resin is further added a liquid permeability improver.
(G) The inorganic acid alkali metal salt powder is at least one type selected from the group consisting of carbonates, bicarbonates, sulfates, bisulfates, sulfites, bisulfites, phosphates, hydrogen phosphates, and chlorides thereof.
(H) A post-decrease dust proportion defined by a dust amount after addition of the inorganic acid alkali metal salt powder with respect to a dust amount before addition of the inorganic acid alkali metal salt powder, is lower than 100%.
(I) The water-absorbent resin is surface crosslinked by at least one type of organic surface-crosslinking agent selected from the group consisting of polyhydric alcohol compounds, amino alcohols, alkylene carbonate compounds, oxazolidinone compounds, and epoxy compounds.
(J) A mass-average particle diameter D50 of the inorganic acid alkali metal salt powder is not larger than 200 μm.

A water absorbent agent of the present invention is the water absorbent agent containing the surface-crosslinked water-absorbent resin in an indefinite ground form as a main component, the water absorbent agent comprising:

a surface of the water absorbent agent is disposed of an inorganic acid alkali metal salt powder.

The preferable embodiment of the present inventive production method includes at least one selected from the group consisting of following (a) to (h), and following (a) to (h) can be arbitrarily selected.
(a) Moisture content of the water-absorbent is not higher than 10% by mass.
(b) Specific surface area of the water absorbent agent is not lower than 25 $m^2/kg$ and proportion of particles of the water-absorbent resin that pass through sieve having mesh opening size of 150 μm to entire water absorbent agent is not higher than 3% by mass.
(c) A total amount of the polyhydric alcohols in the water absorbent agent is not lower than 100 ppm and not higher than 15000 ppm on a mass basis.

(d) A post-prompting-test coloring degree of the water absorbent agent is not smaller than 80 in terms of L-value.
(e) A dust amount of the water absorbent agent is not higher than 150 mg/kg, that is defined by a 30-minute value obtained with a Heubach DUSTMETER.
(f) A content of the inorganic acid alkali metal salt powder of the water absorbent agent relative to 100 parts by mass of the water absorbent agent is not lower than 0.06 parts by mass and not higher than 5 parts by mass.
(g) The inorganic acid alkali metal salt powder is at least one type selected from the group consisting of carbonates, bicarbonates, sulfates, bisulfates, sulfites, bisulfites, phosphates, hydrogen phosphates, and chlorides thereof.
(h) A mass-average particle diameter D50 of the inorganic acid alkali metal salt powder is not larger than 200 μm.

Advantageous Effects of the Invention

The present invention makes it possible to provide: a water absorbent agent having a low moisture content and a small dust generation amount and containing a water-absorbent resin in an indefinite ground form as a main component; and a method for producing the water absorbent agent.

DESCRIPTION OF EMBODIMENTS

As a result of studies regarding dust, the present inventors have found that, since a hydrous gel or a water-absorbent resin ground in a manufacturing process has an indefinite form, a low moisture content thereof causes an end portion of the hydrous gel or the water-absorbent resin to be easily chipped owing to wear or the like, resulting in generation of dust. Such dust can be suppressed by increasing the moisture content as described above. However, if, for example, 2% of water is added to a water-absorbent resin each gram of which absorbs 50 g of an aqueous solution, the absorption amount of a physiological saline solution by each gram of the same water-absorbent resin theoretically decreases by 1 g. Since every one of commercially available disposable diapers for children contains about 10 g of the water absorbent agent, the absorption amount per disposable diaper decreases by about 10 g. This case may lead to leakage by a consumer.

In addition, although the moisture content of the water-absorbent resin can be decreased by heating, addition of a drying step not only causes increase in cost but also leads to evaporation of water in the water-absorbent resin in association with the heating. The evaporation breaks down hydrogen bonds, between carboxyl groups, that are formed via the water molecules, and thus the adhesiveness of the water-absorbent resin is weakened. As a result, a problem arises in that dust is generated again.

Examples of the type of polymerization employed in the present invention include aqueous solution polymerization, reverse phase suspension polymerization, bulk polymerization, precipitation polymerization, and the like. In any of these types of polymerizations, particles having particle diameters not smaller than desired particle diameters may be obtained. In this case, a hydrous gel or a water-absorbent resin has to be ground until the desired particle diameters are obtained. At this time, dust having particle diameters not larger than 1 μm may be generated. The reverse phase suspension polymerization is a concept encompassing gas-phase droplet polymerization, spray polymerization, and liquid-phase droplet polymerization.

As a result of earnest studies, the present inventors have found that, if not lower than 0.06 parts by mass and not higher than 5 parts by mass of an inorganic acid alkali metal salt in the form of a powder (hereinafter, referred to as an "inorganic acid alkali metal salt powder") is added to 100 parts by mass of the above water-absorbent resin in an indefinite ground form, the dust generation amount is small even when the moisture content is low. Consequently, the present inventors arrived at the present invention.

Hereinafter, a method for producing a water absorbent agent of the present invention will be described in detail. However, the scope of the present invention is not limited to this description, and the present invention can be carried out with appropriate modifications which are not exemplified below, without departing from the gist of the present invention. Specifically, the present invention is not limited to the following embodiments, various modifications can be made within the scope of the claims, and embodiments obtained by combining, as appropriate, technical means disclosed in different embodiments are also encompassed in the technical scope of the present invention.

[1] Definition of Terms

[1-1] Water-Absorbent Resin and Water Absorbent Agent

The "water-absorbent resin" in the present specification means a water-swelling and water-insoluble macromolecular gelling agent. The gelling agent is generally in a powder form. The term "water-swelling" means a feature in which an absorption capacity under no load (hereinafter, sometimes written as "CRC") defined in WSP241.3(10) is not lower than 5 g/g. The term "water-insoluble" means a feature in which a soluble content (hereinafter, sometimes written as "Ext") defined in WSP270.3(10) is not higher than 50% by mass.

Although the above "water-absorbent resin" is preferably a hydrophilic crosslinked polymer obtained by crosslinking and polymerizing an unsaturated monomer having a carboxyl group, the water-absorbent resin does not need to be a crosslinked polymer over the entire amount, i.e., 100% by mass, thereof and may contain an additive and the like within a range that allows performances such as the above CRC and Ext to be satisfied.

In addition, the above "water-absorbent resin" may refer to a "polymer of which only the inside is crosslinked, i.e., a polymer of which the inside and the surface have approximately equal crosslink densities" or a "polymer of which the inside and the surface are crosslinked, i.e., a polymer having a relatively higher crosslink density on the surface thereof than on the inside thereof".

In the present specification, the above "polymer of which only the inside is crosslinked" and the above "polymer of which the inside and the surface are crosslinked", are not distinguished from each other in principle and are each written as a "water-absorbent resin". However, if clear distinguishment needs to be made as to presence/absence of surface-crosslinks, the above "polymer of which only the inside is crosslinked" is written as a "pre-surface-crosslinking water-absorbent resin" since surface-crosslinking has not yet been performed, and the above "polymer of which the inside and the surface are crosslinked" is written as a "post-surface-crosslinking water-absorbent resin" since surface-crosslinking has already been performed. The term "pre-surface-crosslinking" means "before addition of a surface-crosslinking agent" or "after addition of a surface-crosslinking agent but before the start of a crosslinking reaction by heating".

The above "water-absorbent resin" may refer only to a resin component but may contain a component other than resin, such as an additive.

The "water absorbent agent" in the present specification means a water absorbent agent in which the above "water-absorbent resin" and an "inorganic acid alkali metal salt powder" have been mixed with each other (hereinafter, sometimes written as a "water-absorbent resin composition"). Therefore, the above "water absorbent agent" encompasses both: a water-absorbent resin composition containing an inorganic acid alkali metal salt powder, in a state where the water-absorbent resin composition can be directly shipped as a final product; and a water-absorbent resin composition containing an inorganic acid alkali metal salt powder, in a state where the water-absorbent resin composition has been further subjected to an optional treatment.

The above "water absorbent agent" contains a water-absorbent resin as a main component. The "main component" means that the mass proportion of the water-absorbent resin to the entire water absorbent agent is preferably not lower than 50% by mass and not lower than 60% by mass, not lower than 70% by mass, not lower than 80% by mass, and not lower than 90% by mass in this order but not higher than 100% by mass. In addition, the above "water absorbent agent" preferably contains, as other components, inorganic acid alkali metal salt powder, water, and a trace component.

[1-2] Polyacrylic Acid (Salt)-Based Water-Absorbent Resin

A "polyacrylic acid (salt)-based water-absorbent resin" in the present specification means a water-absorbent resin formed from a raw material that is acrylic acid and/or a salt thereof (hereinafter, written as "acrylic acid (salt)"). That is, the "polyacrylic acid (salt)-based water-absorbent resin" is a crosslinked polymer that has a structural unit derived from the acrylic acid (salt) and that contains a graft component as an optional component.

Specifically, the polyacrylic acid (salt)-based water-absorbent resin is a crosslinked polymer having an acrylic acid (salt) content that is preferably not lower than 50 mol %, more preferably not lower than 70 mol %, and further preferably not lower than 90 mol % and meanwhile, preferably not higher than 100 mol % and more preferably approximately 100 mol % with respect to moieties excluding an internal crosslinking agent out of monomers related to a polymerization reaction.

[1-3]"EDANA" and "WSP"

"EDANA" is an abbreviation for European Disposables and Nonwovens Associations. "WSP" is an abbreviation for Worldwide Strategic Partners and indicates a global standard measurement method for water absorbent agents or water-absorbent resins, which is provided by the EDANA. In the present invention, physical properties of the water absorbent agent or the water-absorbent resin were measured according to the original version of the WSP (revised in 2010), unless otherwise specified. In the present invention, measurement was performed according to methods in the EXAMPLES described below, unless separately otherwise noted.

[1-4] CRC (WSP241.3(10))

"CRC" is an abbreviation for Centrifuge Retention Capacity and means an absorption capacity under no load of the water absorbent agent or the water-absorbent resin. Specifically, "CRC" refers to an absorption capacity (unit: g/g) after 0.2 g of the water absorbent agent or the water-absorbent resin is put into a bag made of a nonwoven fabric, then the bag is immersed in a large excess of a 0.9%-by-mass aqueous solution of sodium chloride for 30 minutes so as to cause the water absorbent agent or the water-absorbent resin to freely swell, and then the water absorbent agent or the water-absorbent resin is dehydrated by using a centrifugal separator (centrifugal force: 250 G).

[1-5] Ext (WSP270.3(10))

"Ext" is an abbreviation for Extractables and means the water-soluble content, i.e., the water-soluble component amount, of the water absorbent agent or the water-absorbent resin. Specifically, "Ext" refers to a dissolved polymer amount (unit: % by mass) after 1.0 g of the water absorbent agent or the water-absorbent resin is added to 200 ml of a 0.9%-by-mass aqueous solution of sodium chloride and the aqueous solution is stirred for 1 hour or 16 hours at 250 rpm. The dissolved polymer amount is measured by using pH titration. The time for the stirring is written at the time of reporting a result.

[1-6] Gel Grinding Energy

A "gel grinding energy" in the present invention means a mechanical energy, per unit mass of a hydrous gel, that is required by a gel grinding device when the hydrous gel is subjected to gel grinding. Thus, the gel grinding energy includes neither energies for heating and cooling the gel grinding device nor energies of water and steam supplied into the gel grinding device.

The "gel grinding energy" is abbreviated as "GGE". The above GGE is calculated with the following (expression 1) if the gel grinding device is driven by three-phase AC power.

$$\text{GGE(J/g)} = (\sqrt{3} \times \text{voltage} \times \text{power factor} \times \text{motor efficiency})/(\text{mass of hydrous gel supplied per second}) \quad \text{(expression 1)}$$

The above "power factor" and the above "motor efficiency" are each a value that varies depending on an operating condition of the gel grinding device or the like and that is unique to the device. The value ranges from 0 to 1. Meanwhile, if the gel grinding device is driven by single-phase AC power, the above GGE can be calculated with "3" in the above (expression 1) being changed to "1". The unit of the "voltage" is [V], the unit of the "current" is [A], and the unit of the "mass of hydrous gel supplied per second" is [g/s].

Gel grinding of the hydrous gel can be performed also by using a plurality of gel grinding devices. In this case, the GGE only has to be calculated for each of the gel grinding devices.

The mechanical energy applied to the hydrous gel is one of important factors. Thus, the above gel grinding energy is preferably calculated by subtracting a current value obtained when the gel grinding device is idling. In the case where gel grinding is performed with a plurality of devices, the total current value thereof at the time of idling is increased, and thus the method in which calculation is performed by subtracting the current value obtained at the time of idling is particularly preferable. In this case, the gel grinding energy is calculated with the following (expression 2). For distinguishment from the above GGE, a gel grinding energy calculated with the following (expression 2) is written as GGE2.

$$\text{GGE2(J/g)} = (\sqrt{3} \times \text{voltage} \times (\text{current at the time of gel grinding} - \text{current at the time of idling}) \times \text{power factor} \times \text{motor efficiency})/(\text{mass of hydrous gel supplied per second}) \quad \text{(expression 2)}$$

As the "power factor" and the "motor efficiency" in the above (expression 2), values at the time of gel grinding are used. Since the current value at the time of idling is low, the values of the power factor and the motor efficiency at the time of idling are approximately defined as in the above (expression 2). Regarding the "mass of hydrous gel supplied per second" in each of the above (expression 1) and (expression 2), if the hydrous gel is continuously supplied by a quantitative feeder and the unit of the supply amount thereof is [t/hr], the "mass of hydrous gel supplied per second" is calculated through conversion of [t/hr] into [g/s].

[1-7] Other Terms

In the present specification, the term " . . . acid (salt)" means " . . . acid and/or a salt thereof", and the term "(meth)acrylic" means "acrylic and/or methacrylic".

[2] Method for Producing Water Absorbent Agent

The water absorbent agent according to the present invention is made by adding an inorganic acid alkali metal salt powder to a surface-crosslinked water-absorbent resin in an indefinite ground form. As the above water-absorbent resin, a polyacrylic acid (salt)-based water-absorbent resin is preferably used. Hereinafter, a method for producing the above water-absorbent resin will be described in detail.

[2-1] Monomer Aqueous Solution Preparation Step

The present step is a step of preparing a monomer aqueous solution that contains: a monomer that contains acrylic acid (salt) as a main component; and one or more types of polymerizable internal crosslinking agents. The above "main component" means that the amount of the acrylic acid (salt) contained with respect to the moieties excluding each internal crosslinking agent in the monomer used for a polymerization reaction is not lower than 50 mol %, preferably not lower than 70 mol %, and more preferably not lower than 90 mol %, and meanwhile, the amount is preferably not higher than 100 mol %. Although a monomer slurry liquid can also be used within a range that does not influence the water absorption performance of the water absorbent agent obtained as a final product, a monomer aqueous solution will be described for convenience in the present specification.

[2-1-1] Acrylic Acid (Salt)

In the present invention, a known acrylic acid (salt) is preferably used as a monomer (hereinafter, sometimes referred to as a "polymerizable monomer") from the viewpoint of physical properties of and productivity for the water absorbent agent or the water-absorbent resin. The known acrylic acid contains small amounts of components such as a polymerization inhibitor and impurities.

As the above polymerization inhibitor, a methoxyphenol is preferably used, and a p-methoxyphenol is more preferably used. The concentration of the polymerization inhibitor in the acrylic acid is, on a mass basis, preferably not lower than 10 ppm and more preferably not lower than 20 ppm, and meanwhile, the concentration is preferably not higher than 200 ppm, more preferably not higher than 160 ppm, and further preferably not higher than 100 ppm, from the viewpoint of the polymerizability of the acrylic acid, the color tone of the water absorbent agent or the water-absorbent resin, and the like.

Examples of the above impurities include compounds described in US Patent Application Publication No. 2008/0161512 as well as organic compounds such as acetic acid, propionic acid, and furfural.

Examples of the acrylic acid salt include salts obtained by neutralizing the above acrylic acid with the following basic compound. The acrylic acid salt may be a commercially available acrylic acid salt or may be a salt obtained by neutralizing the acrylic acid.

[2-1-2] Basic Compound

The "basic compound" in the present invention means a compound exhibiting basicity. Specifically, examples of the basic compound include sodium hydroxide. Commercially available sodium hydroxides contain heavy metals such as zinc, lead, and iron in a ppm order (on a mass basis), and thus, strictly speaking, the sodium hydroxides can also be expressed as compositions. In the present invention, such compositions are also regarded as being encompassed in a range of basic compounds.

Specific examples of the above basic compound include carbonates and bicarbonates of alkali metals, hydroxides of alkali metals, ammonia, organic amines, and the like. Among these basic compounds, a strongly basic compound is selected from the viewpoint of the water absorption performance of the water absorbent agent or the water-absorbent resin. Therefore, a hydroxide of an alkali metal such as sodium, potassium, or lithium is preferable, and sodium hydroxide is more preferable. The basic compound is preferably made into an aqueous solution from the viewpoint of handleability.

[2-1-3] Neutralization

In the case where a salt obtained by neutralizing the acrylic acid is used as the above acrylic acid salt, the timing of performing neutralization may be any of a timing before polymerization, a timing during polymerization, and a timing after polymerization, and neutralization may be performed at a plurality of timings or locations. Further, neutralization is preferably performed in a continuous manner from the viewpoint of production efficiency for the water absorbent agent or the water-absorbent resin.

In the case of using an acrylic acid (salt) in the present invention, the neutralization ratio thereof with respect to the acid group of the monomer is preferably not lower than 10 mol %, more preferably not lower than 40 mol %, further preferably not lower than 50 mol %, and particularly preferably not lower than 60 mol %, and meanwhile, the neutralization ratio is preferably not higher than 90 mol %, more preferably not higher than 85 mol %, further preferably not higher than 80 mol %, and particularly preferably not higher than 75 mol %. If the neutralization ratio is set to fall within the range, it becomes easier to suppress reduction in the water absorption performance of the water absorbent agent or the water-absorbent resin.

The above range of the neutralization ratio is applied to neutralization at any of the above timings, i.e., a timing before polymerization, a timing during polymerization, and a timing after polymerization. In addition, the range is applied not only to the acid group of the water-absorbent resin but also to the acid group of the water absorbent agent as a final product in the same manner.

[2-1-4] Another Monomer

In the present invention, a monomer other than the above acrylic acid (salt) (hereinafter, written as "another monomer") may be used in combination with the acrylic acid (salt), as necessary.

Specific examples of the above other monomer include: anionic unsaturated monomers and salts thereof such as maleic acid, maleic anhydride, itaconic acid, cinnamic acid, vinylsulfonic acid, allyltoluenesulfonic acid, vinyltoluenesulfonic acid, styrenesulfonic acid, 2-(meth)acrylamide-2-methylpropane sulfonic acid, 2-(meth)acryloylethanesulfonic acid, 2-(meth)acryloylpropanesulfonic acid, and 2-hydroxyethyl(meth)acryloyl phosphate; unsaturated monomers that contain mercaptan groups; unsaturated monomers that contain phenolic hydroxyl groups; unsaturated monomers that contain amide groups, such as (meth)acrylamide, N-ethyl(meth)acrylamide, and N,N-dimethyl (meth)acrylamide; and unsaturated monomers that contain amino groups, such as N,N-dimethylaminoethyl(meth)acrylate, N,N-dimethylaminopropyl (meth)acrylate, and N,N- dimethylaminopropyl(meth)acrylamide. The other monomer contains a water-soluble or hydrophobic unsaturated monomer. In the case of using the other monomer, the use amount thereof with respect to the monomer excluding the internal crosslinking agent is preferably not higher than 30 mol %, more preferably not higher than 10 mol %, and further preferably not higher than 5 mol %.

[2-1-5] Internal Crosslinking Agent

In a preferable producing method in the present invention, an internal crosslinking agent is used. Specific examples of the internal crosslinking agent include N,N'-methylene bis (meth)acrylamide, (poly)ethylene glycol di(meth)acrylate, (poly)propylene glycol di(meth)acrylate, trimethylolpropane di(meth)acrylate, trimethylolpropane tri(meth)acrylate, glycerin tri(meth)acrylate, glycerin acrylate methacrylate, ethylene oxide-modified trimethylolpropane tri(meth)acrylate, pentaerythritol tetra(meth)acrylate, dipentaerythritol hexa(meth)acrylate, triallyl cyanurate, triallyl isocyanurate, triallyl phosphate, triallylamine, poly(meth)allyloxy alkane, (poly)ethylene glycol diglycidyl ether, glycerol diglycidyl ether, ethylene glycol, polyethylene glycol, propylene glycol, glycerin, pentaerythritol, ethylenediamine, polyethyleneimine, glycidyl (meth)acrylate. Among these internal crosslinking agents, one or more types of internal crosslinking agents are selected in consideration of reactivity and the like. From the viewpoint of the water absorption performance of the water absorbent agent or the water-absorbent resin, an internal crosslinking agent having two or more polymerizable unsaturated groups is preferably selected, an internal crosslinking agent having pyrolytic property at a drying temperature described later is more preferably selected, and an internal crosslinking agent having two or more polymerizable unsaturated groups and having a (poly)alkylene glycol structure is further preferably selected.

Specific examples of the above polymerizable unsaturated groups include an allyl group and a (meth)acrylate group. Out of these polymerizable unsaturated groups, a (meth)acrylate group is preferable. Specific examples of the above internal crosslinking agent having a (poly)alkylene glycol structure include polyethylene glycol. The number (hereinafter, sometimes written as "n") of alkylene glycol units is preferably not smaller than 1 and more preferably not smaller than 6, and meanwhile, the number is preferably not larger than 100, more preferably not larger than 50, further preferably not larger than 20, and particularly preferably not larger than 10.

The use amount of the above internal crosslinking agent with respect to the monomer excluding the internal crosslinking agent is preferably not lower than 0.0001 mol %, more preferably not lower than 0.001 mol %, and further preferably not lower than 0.01 mol %, and meanwhile, the use amount is preferably not higher than 10 mol %, more preferably not higher than 5 mol %, and further preferably not higher than 1 mol %. If the use amount is set to fall within the range, it becomes easier to obtain a water absorbent agent or a water-absorbent resin having desired water absorption performance. Meanwhile, if the use amount is outside the range, reduction in an absorption capacity or increase in the water-soluble content due to reduction in a gel strength may be observed.

The above internal crosslinking agent is preferably added in advance at the time of preparing the monomer aqueous solution. In this case, a crosslinking reaction occurs simultaneously with a polymerization reaction. Meanwhile, a polymerization reaction may be started without adding the internal crosslinking agent, and the internal crosslinking agent may be added during the polymerization reaction or after the polymerization reaction, to cause a crosslinking reaction. These methods may be employed in combination. Alternatively, self-crosslinking may be caused without using the internal crosslinking agent.

[2-1-6] Substance to be Added to Monomer Aqueous Solution

In the present invention, when the above monomer aqueous solution is prepared, the following substance may be added to the monomer aqueous solution at one or more timings out of a timing during the above polymerization reaction and crosslinking reaction or a timing after the above polymerization reaction and crosslinking reaction from the viewpoint of improvement in the physical properties of the water absorbent agent or the water-absorbent resin.

Specific examples of the substance include: hydrophilic macromolecules such as starch, starch derivatives, cellulose, cellulose derivatives, polyvinyl alcohol (hereinafter, sometimes referred to as "PVA"), polyacrylic acid (salt), and crosslinked products of polyacrylic acid (salt); and compounds such as carbonate, azo compounds, various foaming agents for generating bubbles, surfactants, chelating agents, and chain transfer agents.

The addition amount of the above hydrophilic macromolecule with respect to the above monomer aqueous solution is preferably not higher than 50% by mass, more preferably not higher than 20% by mass, further preferably not higher than 10% by mass, and particularly preferably not higher than 5% by mass, and meanwhile, the addition amount is preferably not lower than 0% by mass and more preferably higher than 0% by mass. The addition amount of the above compound with respect to the above monomer aqueous solution is preferably not higher than 5% by mass, more preferably not higher than 1% by mass, and further preferably not higher than 0.5% by mass, and meanwhile, the addition amount is preferably not lower than 0% by mass and more preferably higher than 0% by mass.

If a water-soluble resin or a water-absorbent resin is used as the above hydrophilic macromolecule, a graft polymer or water-absorbent resin composition such as a starch-acrylic acid (salt) copolymer and a PVA-acrylic acid (salt) copolymer is obtained. The graft polymer and water-absorbent resin composition are also encompassed in the range of the polyacrylic acid (salt)-based water-absorbent resin according to the present invention.

[2-1-7] Water-Absorbent Resin in Indefinite Ground Form

The method for producing the water absorbent agent according to the present invention is applied to a water-absorbent resin in an indefinite ground form from which dust is easily generated. The water-absorbent resin in an indefinite ground form preferably has a low moisture content and more preferably has a moisture content not higher than 10% by mass. As the water-absorbent resin in an indefinite ground form, a water-absorbent resin in a "foamed form", a "porous form", or a "granulated material form" is also usable.

A specific method for obtaining the water-absorbent resin in the above "indefinite ground form" preferably involves one or more conditions selected from the group consisting of the following conditions (a) to (c):

(a) the water-absorbent resin is a polyacrylic acid (salt)-based water-absorbent resin obtained by performing foaming polymerization on a monomer aqueous solution containing an acrylic acid (salt) as a main component;

(b) the water-absorbent resin is a polyacrylic acid (salt)-based water-absorbent resin obtained through a step of performing gel grinding, at a gel grinding energy 2 not lower than 7 J/g and not higher than 40 J/g, on a crosslinked polymer in the form of a hydrous gel which is obtained simultaneously with or after polymerization of a monomer aqueous solution containing an acrylic acid (salt) as a main component; and (c) the water-absorbent resin is a polyacrylic acid (salt)-based water-absorbent resin obtained through a step of granulating a crosslinked polymer in the form of a hydrous gel or a dried substance thereof, the crosslinked polymer having been obtained simultaneously with or after polymerization of a monomer aqueous solution containing an acrylic acid (salt) as a main component.

[2-1-8] Concentration of Monomer Components

The above substances and components (hereinafter, written as "monomer components") are variously selected according to the purpose, the amounts of the monomer components are defined so as to satisfy the above ranges, and the monomer components are mixed with one another, whereby a monomer aqueous solution is prepared. In the present invention, the monomer components may be made into a mixed solution with water and a hydrophilic solvent instead of being made into an aqueous solution.

From the viewpoint of the physical properties of the water absorbent agent or the water-absorbent resin, the total concentration of the monomer components is preferably not lower than 10% by mass, more preferably not lower than 20% by mass, and further preferably not lower than 30% by mass, and meanwhile, the total concentration is preferably not higher than 80% by mass, more preferably not higher than 75% by mass, and further preferably not higher than 70% by mass. The concentration of the monomer components is calculated from the following expression (3).

$$\text{Concentration of monomer components}(\% \text{ by mass}) = [(\text{mass of monomer components})/(\text{mass of monomer aqueous solution})] \times 100 \quad \text{expression (3)}$$

In the above expression (3), the "mass of monomer aqueous solution" is inclusive none of the masses of a graft component, a water-absorbent resin, and a hydrophobic organic solvent for reverse phase suspension polymerization.

[2-2] Polymerization Step

The present step is a step of obtaining a hydrous gel by polymerizing the monomer aqueous solution which has been obtained in the above monomer aqueous solution preparation step and which contains the monomer containing the acrylic acid (salt) as a main component and the one or more types of polymerizable internal crosslinking agents.

[2-2-1] Polymerization Initiator

In the present invention, a polymerization initiator is used at the time of polymerization. Examples of the polymerization initiator include pyrolytic polymerization initiators, photolytic polymerization initiators, and redox-type polymerization initiators in which these polymerization initiators and reducing agents for promoting decomposition of these polymerization initiators are used in combination. Specific examples of the polymerization initiator include radical polymerization initiators such as sodium persulfate, potassium persulfate, ammonium persulfate, t-butyl hydroperoxide, hydrogen peroxide, and 2,2'-azobis(2-amidinopropane) dihydrochloride. Among these polymerization initiators, one or more types of polymerization initiators are selected in consideration of the type of polymerization and the like. From the viewpoint of handleability of the polymerization initiator and the physical properties of the water absorbent agent or the water-absorbent resin, as the polymerization initiator, a peroxide or an azo compound is preferably selected, a peroxide is more preferably selected, and a persulfate is further preferably selected. In the case of using an oxidizing radical polymerization initiator, a reducing agent such as sodium sulfite, sodium bisulfite, ferrous sulfate, or L-ascorbic acid may be used in combination to cause redox polymerization.

The use amount of the above polymerization initiator with respect to the monomer excluding the internal crosslinking agent is preferably not lower than 0.001 mol % and more preferably not lower than 0.01 mol %, and meanwhile, the use amount is preferably not higher than 1 mol %, more preferably not higher than 0.5 mol %, and further preferably not higher than 0.1 mol %. The use amount of the above reducing agent with respect to the monomer excluding the internal crosslinking agent is preferably not lower than 0.0001 mol % and more preferably not lower than 0.0005 mol %, and meanwhile, the use amount is preferably not higher than 0.02 mol % and more preferably not higher than 0.015 mol %. If the use amount is set to fall within the range, it becomes easier to obtain a water absorbent agent or a water-absorbent resin having desired water absorption performance.

Alternatively, the above polymerization reaction may be started by applying an active energy ray such as radiation, electron beam, or ultraviolet ray in the present invention. The application of active energy ray and the above polymerization initiator may be used in combination.

[2-2-2] Type of Polymerization

Examples of the type of polymerization employed in the present invention include aqueous solution polymerization, reverse phase suspension polymerization, spray polymerization, droplet polymerization, bulk polymerization, precipitation polymerization, and the like. Among these types, from the viewpoint of ease of polymerization control and the water absorption performance of the water absorbent agent or the water-absorbent resin, aqueous solution polymerization or reverse phase suspension polymerization is preferably selected, aqueous solution polymerization is more preferably selected, and continuous aqueous solution polymerization is further preferably selected. The reverse phase suspension polymerization is described in International Publication No. 2007/004529, International Publication No. 2012/023433, and the like. Examples of the continuous aqueous solution polymerization include: endless belt polymerization described in U.S. Pat. Nos. 4,893,999, 6,906, 159, 7,091,253, 7,741,400, 8,519,212, Japanese Laid-Open Patent Publication No. 2005-36100, and the like; and continuous kneader polymerization described in U.S. Pat. No. 6,987,151 and the like.

Examples of a preferable type of the above continuous aqueous solution polymerization include high-temperature initiation polymerization, high-concentration polymerization, foaming polymerization, and the like. The "high-temperature initiation polymerization" refers to a type of polymerization in which the temperature of the monomer aqueous solution at the time of initiation of polymerization is set to be preferably not lower than 30° C., more preferably not lower than 35° C., further preferably not lower than 40° C., and particularly preferably not lower than 50° C., and the upper limit of the temperature is set to be the boiling point of the monomer aqueous solution. The "high-concentration polymerization" refers to a type of polymerization in which the concentration of the monomer at the time of initiation of polymerization is set to be preferably not lower than 30% by mass, more preferably not lower than 35% by mass, further preferably not lower than 40% by mass, and particularly preferably not lower than 42% by mass, and the upper limit of the concentration is set to be the saturation concentration of the monomer aqueous solution. The "foaming polymerization" refers to a type of polymerization in which the above monomer aqueous solution containing a foaming agent or bubbles is polymerized. These types of polymerizations may be performed singly, or two or more of these types of polymerizations may be performed in combination.

The above polymerizations can be performed in an air atmosphere. However, from the viewpoint of the color tone of the water absorbent agent or the water-absorbent resin, the polymerizations are preferably performed in an atmosphere of an inert gas such as nitrogen or argon and are more preferably performed in atmosphere having an oxygen concentration not higher than 1% by volume. Also regarding dissolved oxygen in the monomer aqueous solution, it is preferable that the oxygen is sufficiently substituted with an inert gas, and it is more preferable that the amount of the dissolved oxygen is lower than 1 mg/L.

[2-2-2-1] Foaming Polymerization

In the polymerization step in the present invention, the above "foaming polymerization" is preferably selected as a type of polymerization. By the foaming polymerization, a hydrous gel, a water-absorbent resin, or a water absorbent agent in a foamed form or a porous form is obtained. The water absorbent agent or the water-absorbent resin has a high specific surface area, and thus the water absorption time thereof is shortened. In addition, it becomes also easy to fix the water absorbent agent to an absorbent article. Therefore, the foaming polymerization is preferable. The state of being in a foamed form or a porous form can be confirmed by observing pores in particle surfaces with an electron microscope. Regarding the sizes of the pores, pores having diameters not smaller than 1 μm and not larger than 100 μm are given as an example. The number of the pores per particle of the water absorbent agent or the water-absorbent resin is preferably not smaller than 1 and more preferably not smaller than 10, and meanwhile, the number is preferably not larger than 10000 and more preferably not larger than 1000. The pores can be controlled through the above foaming polymerization.

The above hydrous gel, water-absorbent resin, or water absorbent agent in a foamed form or a porous form is, because of the form thereof, susceptible to mechanical damage and dust is easily generated. The present invention is preferably applied for the purpose of decreasing dust of the hydrous gel, the water-absorbent resin, or the water absorbent agent having such a form. Hereinafter, the foaming polymerization as a method for decreasing dust will be described in detail.

For the above foaming polymerization, one or more means selected from among the following means (a-1) to (a-3) are applied.

(a-1) Means 1: introduction of gas into the monomer aqueous solution (a-2) Means 2: generation of bubbles from dissolved gas in the monomer aqueous solution (a-3) Means 3: use of a foaming agent in the monomer aqueous solution (a-1) Means 1: Introduction of Gas into Monomer Aqueous Solution If not smaller than 0.0015 ml/g of gas with respect to the above monomer aqueous solution is preferably introduced into the monomer aqueous solution, the above advantageous effect is obtained. The introduction amount of gas with respect to the monomer aqueous solution is more preferably not smaller than 0.0035 ml/g and further preferably not smaller than 0.0050 ml/g, and meanwhile, the introduction amount is preferably not larger than 0.030 ml/g, more preferably not larger than 0.025 ml/g, and further preferably not larger than 0.020 ml/g. The above introduction amount of gas is a value at 20° C. under 1 atm.

Specific examples of a method for introducing gas into the monomer aqueous solution include a bubbling method, a static mixer method, a cavitation method, and a Venturi method. These methods can also be used in combination. Specific examples of the above gas include oxygen, air, nitrogen, carbon dioxide gas, ozone, and gas mixtures thereof. Among these gases, from the viewpoint of polymerizability and cost, an inert gas such as nitrogen or carbon dioxide gas is preferably used, and air or nitrogen is more preferably used. When the gas is introduced, or after the introduction, pressure may be normal, increased, or decreased.

(a-2) Means 2: Generation of Bubbles from Dissolved Gas in Monomer Aqueous Solution In the present invention, if polymerization is initiated during a process of generating bubbles in the monomer aqueous solution by decreasing the solubility of the dissolved gas in the monomer aqueous solution, the bubbles can be contained in the hydrous gel. A means for decreasing the solubility of the dissolved gas can be determined appropriately according to intended physical properties, manufacturing cost, and the like. Use of a monomer aqueous solution to which a surfactant and/or a dispersant has been added, enables bubbles to be stably dispersed, and thus is further preferable.

As a specific means for decreasing the solubility of the dissolved gas, there are: a means of increasing the temperature of the monomer aqueous solution; a means of adding water-soluble organic matter; and the like. Among these means, the means of increasing the temperature of the monomer aqueous solution is most preferable. In order to control the introduction amount of bubbles, the amount of the dissolved gas in the monomer aqueous solution may be controlled in advance.

(a-3) Means 3: Use of Foaming Agent in Monomer Aqueous Solution

In the present invention, in a case where a foaming agent is added to the monomer aqueous solution so as to foam the monomer aqueous solution, specific examples of the foaming agent include: azo compounds that generate gas by heating; organic or inorganic carbonate solutions; dispersion liquids; and powders having particle diameters not smaller than 0.1 μm and not larger than 1000 μm. As the foaming agent, a bicarbonate or a carbonate such as sodium carbonate, ammonium carbonate, or magnesium carbonate is preferably used.

The use amount of the above foaming agent is preferably not higher than 5% by mass, more preferably not higher than 1% by mass, and further preferably not higher than 0.5% by mass, and meanwhile, the use amount is preferably higher than 0% by mass and more preferably not lower than 0.1% by mass. If the use amount of the foaming agent is excessively high, a large amount of bubbles are generated, and the bubbles easily merge. Thus, the water absorbent agent which has been consequently obtained has a reduced specific surface area, and the water absorption time thereof is elongated.

Only one of the above steps (a-1) to (a-3) may be performed, or two or more of these steps may be performed in combination. The pattern of the combination is: step (a-1) and step (a-2); step (a-1) and step (a-3); step (a-2) and step (a-3); or step (a-1), step (a-2), and step (a-3). In the above two-step combinations and the above three-step combination, the order of the steps is not limited, and the steps may be performed simultaneously. Two of the above steps are preferably performed in combination, and the three steps are more preferably performed in combination, whereby the amount of bubbles in the monomer aqueous solution can be made further larger than in the case of performing only one of the above steps. If manufacturing cost is considered, step (a-1) and/or step (a-2) is selected. In addition, step (a-1) enables use of temperature increase caused by neutralization at the time of polymerization, and thus is preferable. Further, the combination of step (a-1) and step (a-2) enables, in association with decrease in the solubility in the monomer aqueous solution, bubbles to be more easily generated and contained in the monomer aqueous solution, and thus is particularly preferable.

In the above monomer aqueous solution containing the foaming agent or the bubbles mentioned in the above steps (a-1) to (a-3), a surfactant can also be used to stably retain the bubbles. Examples of the surfactant include anionic surfactants, nonionic surfactants, cationic surfactants, amphoteric surfactants, fluorine-based surfactants, and organic metal surfactants. Specific examples of the surfactant include surfactants described in International Publication No. 97/017397 and U.S. Pat. No. 6,107,358.

If the type and/or the amount of the above surfactant and/or dispersant is adjusted appropriately, a water absorbent agent having desired physical properties is obtained. The surfactant is preferably a non-macromolecular surfactant, and the dispersant is preferably a macromolecular dispersant. The surfactant and/or the dispersant is preferably added at a stage preceding a time at which the temperature of the monomer aqueous solution before polymerization or at the time of polymerization becomes not lower than 50° C.

The type of the surfactant and/or the dispersant can be determined appropriately according to intended physical properties. As specific surfactants, surfactants given in International Publication No. 2011/078298 as examples are suitably used. Among these surfactants, non-ionic surfactants are preferable, non-ionic surfactants having polyoxyethylene chains in the molecules thereof are further preferable, and polyoxyethylene sorbitan fatty acid esters are most preferable.

The use amount of any of these surfactants only has to be adjusted appropriately depending on the type of the surfactant to be used and intended physical properties. The use amount with respect to the amount of the monomers used is preferably higher than 0% by mass, and meanwhile, the use amount is preferably not higher than 2% by mass, more preferably not higher than 0.03% by mass, further preferably not higher than 0.015% by mass, even more preferably not higher than 0.01% by mass, and particularly preferably not higher than 0.008% by mass. The above use amount of the surfactant is applicable also to the hydrous gel after the polymerization. In the case of using a plurality of surfactants, the use amount is the total amount thereof. The use amount is applicable also to a water absorbent agent as a final product obtained after surfactant coating as in "(2-6) Surface-Crosslinking Step" described later is further performed, as necessary.

[2-3] Gel Grinding Step

The present step is a step of obtaining a hydrous gel in a particle form (hereinafter, written as a "particulate hydrous gel") by gel grinding of the hydrous gel obtained in the above polymerization step. For distinguishment from "grinding" in a grinding step described later, grinding in the present step is written as "gel grinding".

The above "gel grinding" means adjustment of the hydrous gel into a predetermined size by using a gel grinding machine such as a kneader, a meat chopper, or a cutter mill.

The manner of execution, an operating condition, and the like of gel grinding that are described in International Publication No. 2015/030129 and International Publication No. 2015/030130 are preferably applied to the present invention. In the case where the type of polymerization is kneader polymerization, the polymerization step and the gel grinding step are performed simultaneously. In the case where a particulate hydrous gel is obtained in the polymerization step as in reverse phase suspension polymerization, spray polymerization, droplet polymerization, or the like, the gel grinding step is regarded as being performed simultaneously with the polymerization step. Through the gel grinding step in the present invention, a water-absorbent resin or a water absorbent agent in an indefinite ground form can be obtained. The state of being in an indefinite ground form can be confirmed also from a particle fracture surface in an electron microscope photo or the like.

In general, the particle diameter of the gel finely granulated by the gel grinding step is preferably within a range of not smaller than 0.1 mm and not larger than 10 mm. If the gel is excessively finely granulated, the physical properties of the water-absorbent resin that is obtained may be low. Meanwhile, if the particle diameter of the gel is excessively large, drying may be insufficient.

The mass-average particle diameter D50 of the above particulate hydrous gel is preferably not smaller than 300 μm and more preferably not smaller than 350 μm, and meanwhile, the mass-average particle diameter D50 is preferably not larger than 1700 μm and more preferably not larger than 1000 μm. If the above mass-average particle diameter D50 is excessively large, shear force and compressive force are unevenly or insufficiently exerted to the particulate hydrous gel. Further, since the particulate hydrous gel is dried from a surface layer portion toward the inside thereof, if the mass-average particle diameter D50 is excessively large, the particulate hydrous gel is ground in a state where the degree of dryness thereof differs between the surface layer portion and the inside. Thus, particles having uneven physical properties are generated. As a result, the physical properties of the entire water absorbent agent that is obtained are decreased. Therefore, an excessively large mass-average particle diameter D50 is not preferable.

If the above mass-average particle diameter D50 is within the above range, excessive drying is suppressed in connection with the surface area of the particulate hydrous gel. Thus, monomers are less likely to remain in the hydrous gel. This contributes to decrease in residual monomers. Therefore, the mass-average particle diameter D50 within the above range is preferable. Further, a large amount of fine powder is not generated by grinding after drying, thereby not only making it easy to control the particle sizes but also preventing decrease in the physical properties such as liquid permeability. Therefore, the mass-average particle diameter D50 within the above range is preferable.

A logarithmic standard deviation $\sigma\zeta$ indicating the degree of narrowness of a particle size distribution of the particle sizes of the above particulate hydrous gel is preferably not smaller than 0.2, and meanwhile, the logarithmic standard deviation $\sigma\zeta$ is preferably not larger than 1.5, more preferably not larger than 1.3, and further preferably not larger than 1.2. The logarithmic standard deviation $\sigma\zeta$ of a particle size distribution, that takes a smaller value has an advantage of leading to more regular particle diameters so that more even drying can be performed. However, setting of the logarithmic standard deviation σζ of the particle size distribution to be smaller than 0.2 requires special operations such as: control of particle sizes at the time of polymerization before the gel grinding; and classification of the particulate hydrous gel after the gel grinding. Thus, if productivity and cost are considered, the logarithmic standard deviation σζ is preferably not smaller than 0.2.

In the present invention, it is desirable that a foaming polymerization condition, a gel grinding condition, and the particle size distribution are controlled such that the specific surface area of a pre-surface-crosslinking water-absorbent resin is set to be not lower than 25 $m^2$/kg. Specifically, if the gel grinding step in the present invention is performed by any of gel grinding methods described in International Publication No. 2015/030129 and International Publication No. 2015/030130, the specific surface area of the pre-surface-crosslinking water-absorbent resin can be increased to be not lower than 25 $m^2$/kg.

A desired specific surface area is obtained by appropriately controlling the die bore diameter, the number of bores, the die thickness, the hot water addition amount, the rotation rate about a screw axis, and the like of a grinding device such as a meat chopper. In addition, this gel grinding technique may be combined with the aforementioned foaming polymerization.

The mass-average particle diameter D50 of the above particulate hydrous gel and the logarithmic standard deviation σζ of the particle size distribution are measured according to a method described in International Publication No. 2016/111223.

In the present invention, if the hydrous gel is finely granulated by a power having a gel grinding energy 2 (hereinafter, written as "GGE2") not lower than 7 J/g and not higher than 40 J/g, the specific surface area of the pre-surface-crosslinking water-absorbent resin can be easily set to be not lower than 25 $m^2$/kg. The GGE2 is preferably not lower than 7 J/g and more preferably not lower than 8 J/g, and meanwhile, the GGE2 is preferably not higher than 32 J/g and more preferably not higher than 25 J/g. In the present invention, it is also preferable that the hydrous gel processed at the above GGE2 is controlled to fall within the above suitable range.

[2-4] Drying Step

The present step is a step of obtaining a dried polymer by drying the hydrous gel and/or the particulate hydrous gel obtained in the above polymerization step and/or gel pulverization step to a desired resin solid content. The resin solid content of the dried polymer is obtained from a change in mass at the time of heating 1 g of the water-absorbent resin at 180° C. for 3 hours. The resin solid content is preferably not lower than 80% by mass, more preferably not lower than 85% by mass, further preferably not lower than 90% by mass, and particularly preferably not lower than 92% by mass, and meanwhile, the resin solid content is preferably not higher than 99% by mass, more preferably not higher than 98% by mass, and further preferably not higher than 97% by mass.

Specific examples of the method for drying the above hydrous gel and/or particulate hydrous gel include heat drying, hot air drying, drying under reduced pressure, fluidized bed drying, infrared drying, microwave drying, drum dryer drying, drying through azeotropic dehydration with a hydrophobic organic solvent, high humidity drying using high-temperature steam, and the like. Among these methods, from the viewpoint of drying efficiency, hot air drying is preferable, and band drying in which hot air drying is performed on a ventilation belt is more preferable.

From the viewpoint of the color tone of and drying efficiency for the water-absorbent resin, a drying temperature in the above hot air drying is preferably not lower than 100° C. and more preferably not lower than 150° C., and meanwhile, the drying temperature is preferably not higher than 300° C. and more preferably not higher than 200° C. The drying temperature in the hot air drying is determined by the temperature of hot air. Drying conditions other than the above drying temperature such as the speed of hot air and a drying time may be set appropriately according to the moisture content and the total mass of the particulate hydrous gel to be dried and a target resin solid content. When band drying is performed, various conditions described in the pamphlet of International Publication No. 2006/100300, the pamphlet of International Publication No. 2011/025012, the pamphlet of International Publication No. 2011/025013, the pamphlet of International Publication No. 2011/111657, and the like are adopted appropriately as the drying conditions.

The drying time in the present invention is preferably not shorter than 1 minute, more preferably not shorter than 5 minutes, and further preferably not shorter than 10 minutes, and meanwhile, the drying time is preferably not longer than 10 hours, more preferably not longer than 3 hours, and further preferably not longer than 1 hour. If the drying temperature and the drying time are set to fall within the ranges, the physical properties of the water absorbent agent to be obtained can be set to fall within desired ranges. In the case where drying is performed by hot air drying, the speed of hot air is preferably not lower than 0.5 m/s, and meanwhile, the speed is preferably not higher than 3.0 m/s and more preferably not higher than 2.0 m/s. Other drying conditions only have to be set appropriately according to the moisture content and the total weight of the particulate hydrous gel to be dried, a target solid content, and the like.

If the above various conditions for the drying are controlled to fall within the above range, unevenness is less likely to occur in the physical properties of the dried polymer, and the solid content can be controlled to fall within the predetermined range. Further, deterioration of the color tone and decrease in the water absorption performance of the water-absorbent resin that is obtained can be suppressed.

[2-5] Pulverization Step and Classification Step

These steps are such that the post-drying dried polymer obtained through the above drying step is pulverized in a pulverization step and adjustment to particle sizes within a desired range is performed in a classification step, to obtain a pre-surface-crosslinking water-absorbent resin having the specific surface area of 25 $m^2$/kg or higher. Through the pulverization step after drying, a water-absorbent resin or a water absorbent agent in an indefinite pulverized form can be obtained.

Examples of a pulverizer used in the above pulverization step include high-speed rotary pulverizers such as a roll mill, a hammer mill, a screw mill, and a pin mill, a vibration mill, a knuckle type pulverizer, a cylindrical mixer, and the like. Among these pulverizers, a roll mill is preferably selected from the viewpoint of pulverization efficiency. A plurality of these pulverizers may be used in combination as well.

Examples of an adjustment method for particle sizes in the above classification step include sieve classification with a JIS standard sieve (JIS Z8801-1 (2000)), air-flow classification, and the like. Among these adjustment methods, sieve classification is preferably selected from the viewpoint of classification efficiency. The steps in which particle size adjustment for the water absorbent agent or the water-absorbent resin is performed, are not limited to the pulverization step and the classification step. The particle size adjustment may be performed in the polymerization step that particularly involves reverse phase suspension polymerization, droplet polymerization, or the like. The particle size adjustment may be performed also in another step, e.g., a granulating step or a fine powder collecting step.

In the pre-surface-crosslinking water-absorbent resin having been classified, (i) the proportion of particles of the water-absorbent resin contained therein and having particle diameters smaller than 150 μm is preferably not higher than 3% by mass, more preferably not higher than 2.5% by mass, and further preferably not higher than 2% by mass.

In addition, (ii) the mass-average particle diameter D50 of the pre-surface-crosslinking water-absorbent resin is preferably not smaller than 300 μm, and meanwhile, the mass-average particle diameter D50 is preferably not larger than 500 μm, further preferably not larger than 450 μm, and particularly preferably not larger than 400 μm.

Further, (iii) it is more preferable that, in a particle size distribution of the pre-surface-crosslinking water-absorbent resin, the mass-average particle diameter D50 falls within the range in the above condition (ii) and the proportion of the particles smaller than 150 μm falls within the range in the above condition (i).

Furthermore, (iv) the logarithmic standard deviation as indicating the degree of narrowness of the particle size distribution of the pre-surface-crosslinking water-absorbent resin is preferably not smaller than 0.20, more preferably not smaller than 0.25, and further preferably not smaller than 0.27, and meanwhile, the logarithmic standard deviation σζ is preferably not larger than 0.50, more preferably not larger than 0.40, and further preferably not larger than 0.35. The logarithmic standard deviation σζ of the particle size distribution, that takes a smaller value has an advantage of leading to more regular particle diameters so that segregation of the particles occurs less. However, excessive reduction in the logarithmic standard deviation σζ of the particle size distribution requires removal of coarse particles and fine particles by repetition of pulverization and classification, whereby a disadvantage may be incurred from the viewpoint of productivity and cost.

Further, (v) the specific surface area of the pre-surface-crosslinking water-absorbent resin is preferably not lower than 25 $m^2$/kg, more preferably not lower than 27 $m^2$/kg, and further preferably not lower than 30 $m^2$/kg, and meanwhile, the specific surface area is preferably not higher than 50 $m^2$/kg, more preferably not higher than 47 $m^2$/kg, and further preferably not higher than 45 $m^2$/kg. If the specific surface area is increased, the ratio of contact with a liquid is increased at the time of use. This is advantageous in improving characteristics such as a water absorption time. If the particle size of the pre-surface-crosslinking water-absorbent resin is smaller, the specific surface area thereof becomes higher.

The above particle size and the like, i.e., the above conditions (i) to (v), are applied not only to the pre-surface-crosslinking water-absorbent resin but also a post-surface-crosslinking water-absorbent resin or a water absorbent agent. Thus, it is preferable to perform surface-crosslinking treatment in a surface-crosslinking step such that the particle size having been adjusted to fall within the above range for the pre-surface-crosslinking water-absorbent resin is maintained. It is more preferable to adjust the particle size by providing a sizing step subsequently to the surface-crosslinking step. In the present invention, the above conditions (i) to (v) can be arbitrarily combined with one another. That is, while the conditions (i) to (v) are also preferably adjusted individually, two or more of the conditions are also preferably combined with one another. In the case of combining a plurality of the conditions with one another, a synergistic effect is obtained. In addition, in the case of combining two or more of the conditions with one another, the above suitable ranges can be selected in any combinations. As a matter of course, all of the conditions (i) to (v) may be combined with one another. Among these conditions, the condition (iii) which is a combination of the conditions (i) and (ii) is preferable, a combination of the conditions (iii) and (iv) is more preferable, and a combination of the conditions (iii), (iv), and (v) is further preferable. These combinations are applied in the present invention.

[2-6] Surface-Crosslinking Step

The present step is a step of forming a portion having a higher crosslink density on the surface layer of the pre-surface-crosslinking water-absorbent resin obtained through the above steps. The present step includes a mixing step, a heating step, a cooling step, and the like. In the surface-crosslinking step, radical crosslinking, surface polymerization, a crosslinking reaction with a surface-crosslinking agent, and the like occur at the surface of the water-absorbent resin not having yet been subjected to the surface-crosslinking step, whereby a surface-crosslinked water-absorbent resin is obtained.

[2-6-1] Mixing Step

The present step is a step of obtaining a humidified mixture by mixing, in a mixing device, a solution containing a surface-crosslinking agent (hereinafter, written as a "surface-crosslinking agent solution") with the pre-surface-crosslinking water-absorbent resin.

[2-6-1-1] Surface-Crosslinking Agent

In the present invention, a surface-crosslinking agent is used at the time of surface-crosslinking. As the surface-crosslinking agent, it is preferable to use at least one type of organic surface-crosslinking agent selected from the group consisting of polyhydric alcohol compounds, amino alcohols, alkylene carbonate compounds, oxazolidinone compounds, and epoxy compounds. An organic surface-crosslinking agent capable of forming ester bonds between the organic surface-crosslinking agent and a carboxyl group is preferable as the surface-crosslinking agent. Examples of the surface-crosslinking agent that forms ester bonds (preferably, dehydration ester bonds) between the surface-crosslinking agent and a functional group, e.g., a carboxyl group, of the polycarboxylic acid-based water-absorbent resin, include: organic surface-crosslinking agents having hydroxyl groups in the molecules thereof, such as polyhydric alcohols and amino alcohols; and organic surface-crosslinking agents that generate hydroxyl groups by ring-opening, such as alkylene carbonates, oxazolidinones, oxetanes, and epoxy compounds.

More specific examples of the above surface-crosslinking agent include: polyhydric alcohol compounds such as ethylene glycol, diethylene glycol, triethylene glycol, tetraethylene glycol, polyethylene glycol, propylene glycol, 1,3-propanediol, 1-methyl-1,3-propanediol, 2-methyl-1,3-propanediol, dipropylene glycol, 2,2,4-trimethyl-1,3-pentanediol, 2,3,4-trimethyl-1,3-pentanediol, polypropylene glycol, glycerin, polyglycerin, 2-butene-1,4-diol, 1,4-butanediol, 1,3-butanediol, 1,5-pentanediol, 1,6-hexanediol, 1,2-cyclohexanemethanol, 1,2-cyclohexanedimethanol, 1,2-cyclohexanediol, trimethylolpropane, diethanolamine, triethanolamine, polyoxypropylene, oxyethylene-oxypropylene block copolymer, pentaerythritol, meso-erythritol, D-sorbitol, and sorbitol; epoxy compounds such as ethylene glycol diglycidyl ether, polyethylene glycol diglycidyl ether, glycerol polyglycidyl ether, diglycerol polyglycidyl ether, polyglycerol polyglycidyl ether, propylene glycol diglycidyl ether, polypropylene glycol diglycidyl ether, and glycidol; polyvalent amine compounds such as ethylenediamine, diethylene triamine, triethylene tetramine, tetraethylene pentamine, pentaethylene hexamine, polyethyleneimine, and polyamide polyamine, and inorganic salts and organic salts of these polyvalent amine compounds, e.g., aziridinium salt and the like; polyvalent isocyanate compounds such as 2,4-tolylene diisocyanate and hexamethylene diisocyanate; haloepoxy compounds such as epichlorohydrin, epibromohydrin, and α-methylepichlorohydrin; polyvalent oxazoline compounds such as 1,2-ethylenebisoxazoline; oxazolidinone compounds such as N-acyloxazolidinone and 2-oxazolidinone; alkylene carbonate compounds such as 1,3-dioxolan-2-one, 4-methyl-1,3-dioxolan-2-one, 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxan-2-one, 4-methyl-1,3-dioxan-2-one, 4,6-dimethyl-1,3-dioxan-2-one, and 1,3-dioxopan-2-one; cyclic urea compounds; oxetane compounds such as oxetane, 2-methyloxetane, 3-methyl-3-hydroxymethyloxetane, and 3-ethyl-3-hydroxymethyloxetane; amino alcohol compounds such as ethanolamine; polyvalent metal compounds such as hydroxides and chlorides of zinc, calcium, magnesium, aluminum, iron, zirconium, and the like; and the like.

Among these surface-crosslinking agents, at least one type of surface-crosslinking agent selected from the group consisting of polyhydric alcohol compounds, epoxy compounds, polyvalent amine compounds and salts thereof, oxetane compounds, and alkylene carbonate compounds, is preferable. The surface-crosslinking agent is more preferably one or more types selected from the group consisting of: polyhydric alcohols having 3 or more and 6 or less carbon atoms, and having 2 or more and 3 or less hydroxyl groups contained in the molecules thereof; epoxy compounds having 6 or more and 12 or less carbon atoms; alkylene carbonates having 3 or more and 5 or less carbon atoms; and oxetane compounds having 3 or more and 10 or less carbon atoms.

Out of the above surface-crosslinking agents, one type of surface-crosslinking agent or two or more types of surface-crosslinking agents are used in consideration of the reactivity thereof and the heating temperature in the heating step. The surface-crosslinking step may be performed two or more times in consideration of the effect thereof. In this case, the second or subsequent time of the step may be performed by using the same surface-crosslinking agent as that in the first time of the step, or may be performed by using a different surface-crosslinking agent.

The use amount of the above surface-crosslinking agent relative to 100 parts by mass of the pre-surface-crosslinking water-absorbent resin is preferably not lower than 0.01 parts by mass, and meanwhile, the use amount is preferably not higher than 10 parts by mass, more preferably not higher than 5 parts by mass, and further preferably not higher than 2 parts by mass. If the use amount of the surface-crosslinking agent is set to fall within the range, an optimum crosslinked structure can be formed at the surface layer of the pre-surface-crosslinking water-absorbent resin, and it becomes even easier to obtain a water-absorbent resin or a water absorbent agent having high physical properties. In the case of using a plurality of surface-crosslinking agents, the use amount refers to the total amount of the surface-crosslinking agents.

The above surface-crosslinking agent is preferably added in the form of a solution to the above water-absorbent resin. In this case, the use amount of water relative to 100 parts by mass of the pre-surface-crosslinking water-absorbent resin is preferably not lower than 0.1 parts by mass, more preferably not lower than 0.3 parts by mass, and further preferably not lower than 0.5 parts by mass, and meanwhile, the use amount is preferably not higher than 20 parts by mass, more preferably not higher than 15 parts by mass, and further preferably not higher than 10 parts by mass. If the use amount of water is set to fall within the range, the handleability of the surface-crosslinking agent solution is further improved, and it becomes easy to evenly mix the surface-crosslinking agent with the pre-surface-crosslinking water-absorbent resin.

The concentration of the surface-crosslinking agent in the surface-crosslinking agent solution can be determined appropriately. The concentration of the surface-crosslinking agent in the above surface-crosslinking agent solution is, to obtain improved physical properties by forming an optimum crosslinked structure at the surface layer of the pre-surface-crosslinking water-absorbent resin by surface-crosslinking the pre-surface-crosslinking water-absorbent resin having a high specific surface area, preferably not lower than 0.1% by mass, more preferably not lower than 1% by mass, and further preferably not lower than 5% by mass, and meanwhile, the concentration is preferably not higher than 50% by mass, more preferably not higher than 40% by mass, and further preferably not higher than 30% by mass.

In addition, a hydrophilic organic solvent can also be used in combination with the above water as necessary, to obtain the above surface-crosslinking agent solution. In this case, the use amount of the hydrophilic organic solvent relative to 100 parts by mass of the pre-surface-crosslinking water-absorbent resin is preferably not higher than 5 parts by mass, more preferably not higher than 3 parts by mass, and further preferably not higher than 1 part by mass. Specific examples of the hydrophilic organic solvent include: lower alcohols such as methyl alcohol; ketones such as acetone; ethers such as dioxane; amides such as N,N-dimethylformamide; sulfoxides such as dimethyl sulfoxide; polyhydric alcohols such as ethylene glycol; and the like. However, these hydrophilic organic solvents should be minimized and in the case of using a hydrophilic organic solvent, the use amount thereof is preferably limited to as small an amount as possible, and most preferably no use of the hydrophilic organic solvents.

In addition, various additives to be added in "[2-7] Additives and Addition Step Therefor can be added to the above surface-crosslinking agent solution or can also be separately added in the mixing step, within a range of not higher than 5 parts by mass.

[2-6-1-2] Mixing Method and Mixing Condition

Examples of a method for mixing the above pre-surface-crosslinking water-absorbent resin and the above surface-crosslinking agent solution include a method in which: a surface-crosslinking agent solution is made in advance; and the solution is mixed by preferably being sprayed or dropped and more preferably being sprayed to the pre-surface-crosslinking water-absorbent resin.

As a mixing device for performing the above mixing, a mixing device having a torque that is necessary to evenly and assuredly mix the pre-surface-crosslinking water-absorbent resin and the surface-crosslinking agent with each other is preferable. The mixing device is preferably a high-speed stirring type mixer and more preferably a high-speed stirring type continuous mixer. The rotation rate of the high-speed stirring type mixer is preferably not lower than 100 rpm and more preferably not lower than 300 rpm, and meanwhile, the rotation rate is preferably not higher than 10000 rpm and more preferably not higher than 2000 rpm.

From the viewpoint of mixability with the surface-crosslinking agent solution and aggregability of the humidified mixture, the temperature of the pre-surface-crosslinking water-absorbent resin supplied in the present step is preferably not lower than 15° C., more preferably not lower than 17° C., further preferably not lower than 20° C., and meanwhile, the temperature is preferably not higher than 80° C., more preferably not higher than 70° C., and further preferably not higher than 60° C. The mixing time is preferably not shorter than 1 second and more preferably not shorter than 5 seconds, and meanwhile, the mixing time is preferably not longer than 1 hour and more preferably not longer than 10 minutes.

[2-6-2] Heating Step

The present step is a step of heating the humidified mixture obtained in the above mixing step, to cause a crosslinking reaction on the surface of the pre-surface-crosslinking water-absorbent resin.

The heating of the above humidified mixture may be performed in a state where the humidified mixture is left at rest, or may be performed while the humidified mixture is in a flowing state by using power of stirring or the like. However, the humidified mixture is preferably heated while being stirred, in that the entire humidified mixture can be evenly heated. Specific examples of a heating device for performing the above heating include a paddle dryer, a multi-fin processor, a towered dryer, and the like.

The heating temperature in the present step is, from the viewpoint of: the type and the amount of the surface-crosslinking agent; and the water absorption performance of the water absorbent agent or the water-absorbent resin, preferably not lower than 150° C., more preferably not lower than 170° C., further preferably not lower than 180° C., and meanwhile, the heating temperature is preferably not higher than 250° C. and more preferably not higher than 240° C.

Control of the heating temperature and the heating time to fall within the above ranges leads to improvement in the water absorption performance of the water absorbent agent or the post-surface-crosslinking water-absorbent resin to be obtained, and thus is preferable.

[2-6-3] Cooling Step

The present step is an optional step provided as necessary subsequently to the above heating step. The present step is a step of forcibly cooling the post-surface-crosslinking water-absorbent resin having been subjected to the above heating step to a predetermined temperature, to swiftly end the surface-crosslinking reaction.

The cooling of the above post-surface-crosslinking water-absorbent resin may be performed in a state where the water-absorbent resin is left at rest, or may be performed while the water-absorbent resin is in a flowing state by using power of stirring or the like. However, the water-absorbent resin is preferably cooled while being stirred, in that the entire water-absorbent resin can be evenly cooled. Examples of a cooling device for performing the above cooling include a paddle dryer, a multi-fin processor, a towered dryer, and the like from the above viewpoint. These cooling devices may have the same specifications as those of the heating device used in the heating step. This is because the heating device can be used as a cooling device by changing the heat medium of the heating device to a cooling medium.

The cooling temperature in the present step only has to be set appropriately according to the heating temperature in the heating step, the water absorption performance of the water absorbent agent or the water-absorbent resin. Cooling is desirably performed such that the temperature of the post-surface-crosslinking water-absorbent resin when adding the inorganic acid alkali metal salt powder to the water-absorbent resin is preferably not higher than 150° C., more preferably not higher than 100° C., further preferably not higher than 90° C., and particularly preferably not higher than 70° C., and meanwhile, the temperature is preferably not lower than 5° C. and more preferably not lower than 10° C. Setting of the temperature of the post-surface-crosslinking water-absorbent resin to fall within the above range leads to achievement of favorable mixability between the inorganic acid alkali metal salt powder and the water-absorbent resin, and thus is preferable.

The form of the water-absorbent resin obtained through the surface-crosslinking is an indefinite ground form unless granulation or the like is performed. Thus, the water-absorbent resin has a high specific surface area and has a short water absorption time. Grinding or the like may be performed on the water-absorbent resin particles after the surface-crosslinking. However, if the grinding or the like is performed, a surface-crosslinking effect is decreased. A water-absorbent resin in an indefinite ground form, and more preferably a water-absorbent resin in an indefinite form having a high specific surface area, can be obtained by performing foaming polymerization at the time of polymerization and performing grinding on the hydrous gel or the dried polymer.

In the post-surface-crosslinking water-absorbent resin, (i) the proportion of particles contained therein that pass through a sieve having a mesh opening size of 150 μm to the entire water-absorbent resin, is preferably not higher than 3% by mass. The particles that pass through the sieve having a mesh opening size of 150 μm, i.e., particles having particle diameters smaller than 150 μm, can be appropriately adjusted by employing the same particle size adjustment method as the method in the above classification step for the water-absorbent resin. Besides the proportion of the particles smaller than 150 μm, it is desirable that, in the same manner as in the above pre-surface-crosslinking water-absorbent resin having been subjected to the classification, (ii) the mass-average particle diameter D50 is preferably not smaller than 300 μm and not larger than 500 μm, (iii) the mass-average particle diameter D50 and the particles smaller than 150 μm are preferably within the above ranges, (iv) the logarithmic standard deviation σζ is preferably not smaller than 0.20 and not larger than 0.50, and (v) the specific surface area is preferably not lower than 25 m$^2$/kg and not higher than 50 m$^2$/kg. In addition, respective suitable ranges, combinations, and the like of the conditions (i) to (v) are also the same as those for the above pre-surface-crosslinking water-absorbent resin having been subjected to the classification. In the present invention, it is preferable that: the specific surface area of the surface-crosslinked water-absorbent resin in an indefinite ground form is not lower than 25 m$^2$/kg; and the proportion of the particles that pass through the sieve having a mesh opening size of 150 μm to the entire water-absorbent resin is not higher than 3% by mass.

[2-7] Additives and Addition Step Therefor

In the present invention, an additive is added to the post-surface-crosslinking water-absorbent resin. In other words, the water absorbent agent can contain the additive in addition to the water-absorbent resin. Examples of the additive include liquid permeability improvers or identical-component agents, and other additives. One type of these additives may be used, or two or more types of these additives may be used in combination.

[2-7-1] Liquid Permeability Improver or Identical-Component Agent

Examples of the liquid permeability improver used in the present invention include an additive having a function of improving the saline solution flow conductivity (hereinafter, referred to as "SFC") and the gel bed permeability under load or under no load (hereinafter, referred to as "GBP") of the water absorbent agent or the water-absorbent resin. One or more type of compound selected from among polyvalent metal salts, cationic polymers, and inorganic fine particles can be used. As necessary, two or more types of the compounds can be used in combination.

These additives may be used to exhibit other functions such as those of an anti-caking agent at moisture absorption, a powder flow control agent, and a binder for water-absorbent resins without being intended to improve liquid permeability. If the additives are added for the purpose of the other functions, the additives are referred to as identical-component agents.

The addition amount of the above liquid permeability improver or identical-component agent is set appropriately according to the selected compound. Not only in the case of using these additives singly but also in the case of using two or more types of these additives in combination, respective suitable addition amounts thereof can be selected appropriately within ranges described below.

The above "SFC" is an abbreviation for Saline Flow Conductivity. The SFC indicates the liquid permeability, by a 0.69%-by-mass aqueous solution of sodium chloride, of the water absorbent agent or the water-absorbent resin under a load of 2.07 kPa. The SFC is a value measured according to an SFC test method described in U.S. Pat. No. 5,669,894.

The above "GBP" is an abbreviation for Gel Bed Permeability. The GBP indicates the liquid permeability, by a 0.9%-by-mass aqueous solution of sodium chloride, of the water absorbent agent or the water-absorbent resin under load or in a state of free swelling. The GBP is a value measured according to a GBP test method described in International Publication No. 2005/016393.

[2-7-1-1] Polyvalent Metal Salt

In the case of using a polyvalent metal salt, the valence of a polyvalent metal cation of the polyvalent metal salt is preferably not smaller than 2 and more preferably not smaller than 3, and meanwhile, the valence is preferably not larger than 4. Examples of a usable polyvalent metal include aluminum, zirconium, and the like. Therefore, examples of the polyvalent metal salt that is usable in the present step include aluminum lactate, zirconium lactate, aluminum sulfate, zirconium sulfate, and the like. Among these polyvalent metal salts, from the viewpoint of an effect of improving the SFC, aluminum lactate or aluminum sulfate is more preferable and aluminum sulfate is further preferable.

The addition amount of the above polyvalent metal salt per 1 g of the water-absorbent resin is preferably not smaller than 0 moles and smaller than $3.6 \times 10^{-5}$ moles, more preferably not smaller than 0 moles and smaller than $1.4 \times 10^{-5}$ moles, and further preferably not smaller than 0 moles and smaller than $1.0 \times 10^{-5}$ moles.

[2-7-1-2] Cationic Polymer

In the case of using a cationic polymer, examples of the cationic polymer include substances described in U.S. Pat. No. 7,098,284. Among these substances, from the viewpoint of an effect of improving the SFC and the GBP, vinylamine polymer is more preferable. The mass-average molecular weight of the cationic polymer is preferably not smaller than 5000 and not larger than 1000000.

The addition amount of the above cationic polymer relative to 100 parts by mass of the water-absorbent resin is preferably not lower than 0 parts by mass and more preferably higher than 0 parts by mass, and meanwhile, the addition amount is preferably lower than 2.5 parts by mass, more preferably lower than 2.0 parts by mass, and further preferably lower than 1.0 part by mass.

[2-7-1-3] Inorganic Fine Particles

In the case of using inorganic fine particles, examples of the inorganic fine particles include substances described in U.S. Pat. No. 7,638,570. Among these substances, from the viewpoint of the effect of improving the SFC and the GBP, silicon dioxide is preferable.

In the case where the above inorganic fine particles have a primary particle diameter smaller than 20 nm, the inorganic fine particles only have to be added such that the amount thereof relative to 100 parts by mass of the water-absorbent resin is preferably not lower than 0 parts by mass and more preferably higher than 0 parts by mass, and meanwhile, the amount is preferably lower than 1.2 parts by mass, more preferably lower than 1.0 part by mass, and further preferably lower than 0.5 parts by mass. Meanwhile, in the case where the primary particle diameter is not smaller than 20 nm, the inorganic fine particles only have to be added such that the amount thereof relative to 100 parts by mass of the water-absorbent resin is preferably not lower than 0 parts by mass and more preferably higher than 0 parts by mass, and meanwhile, the amount is preferably lower than 2.0 parts by mass, more preferably lower than 1.5 parts by mass, and further preferably lower than 1.0 part by mass. Dust may increase remarkably depending on the type and amount of the selected inorganic fine particles, and the production method of the present invention may not reduce dust. Therefore, the inorganic fine particles may be appropriately selected and adjusted.

[2-7-2] Another Additive

Specific examples of another additive include chelating agents, inorganic reducing agents, aromatic substances, organic reducing agents, hydroxy carboxylic acid compounds, surfactants, compounds having phosphorus atoms, oxidizing agents, organic powders of metallic soap and the like, deodorants, antibacterial agents, pulp, thermoplastic fibers, and the like. One of the other additives is usable, or two or more of the other additives are also usable. Among the other additives, chelating agents are preferable, and amino-polycarboxylic acids and amino-polyvalent phosphoric acids are more preferable. Specific examples of the chelating agent include chelating agents described in Japanese Laid-Open Patent Publication No. H11-060975, the pamphlet of International Publication No. 2007/004529, the pamphlet of International Publication No. 2011/126079, the pamphlet of International Publication No. 2012/023433, Japanese Laid-Open Patent Publication (Translation of PCT Application) No. 2009-509722, Japanese Laid-Open Patent Publication No. 2005-097519, Japanese Laid-Open Patent Publication No. 2011-074401, Japanese Laid-Open Patent Publication No. 2013-076073, Japanese Laid-Open Patent Publication No. 2013-213083, Japanese Laid-Open Patent Publication No. S59-105448, Japanese Laid-Open Patent Publication No. S60-158861, Japanese Laid-Open Patent Publication No. H11-241030, Japanese Laid-Open Patent Publication No. H2-41155, and the like.

The other additive, particularly the chelating agent, is added or contained preferably within a range of not lower than 0.001% by mass and not higher than 1% by mass with respect to the monomer or the water-absorbent resin. It is more preferable to select an addition method that does not reduce the solid content as much as possible.

[2-7-3] Additive Addition Step

The above additives can be added before, after, or during one or more step selected from among the above monomer aqueous solution preparation step, the above polymerization step, the above gel pulverization step, the above drying step, the above pulverization step, the above classification step, and the above surface-crosslinking step. The additives are preferably added before, after, or during any step subsequent to the polymerization step.

In the case where the above additives are added to the water-absorbent resin, if the additives are in the form of a liquid or a solution obtained with an aqueous medium such as water, it is preferable to spray the liquid or the solution to the water-absorbent resin and apply a sufficient torque to evenly and assuredly mix the water-absorbent resin and the additives with each other. Meanwhile, if the above additives are in a solid form such as powder form, the additives may be dry-blended with the water-absorbent resin, or an aqueous liquid such as water may be used as a binder.

Specific examples of a device used for the above mixing include a stirring type mixer, a cylindrical mixer, a double walled conical mixer, a V-shaped mixer, a ribbon mixer, a screw mixer, a flow type/rotary disk type mixer, an airflow mixer, a double-arm kneader, an internal mixer, a pulverizing kneader, a rotary mixer, a screw extruder, and the like. In the case of using a stirring type mixer, the rotation rate thereof is preferably not lower than 5 rpm and more preferably not lower than 10 rpm, and meanwhile, the rotation rate is preferably not higher than 10000 rpm and more preferably not higher than 2000 rpm.

[2-8] Inorganic Acid Alkali Metal Salt Powder and Adding Step Therefor

The present step is a step of mixing an inorganic acid alkali metal salt powder with the surface-crosslinked water-absorbent resin in an indefinite ground form. If this treatment is performed under the following conditions in the present invention, a dust generation amount is made small.

The water-absorbent resin to which the inorganic acid alkali metal salt powder is to be added, is the surface-crosslinked water-absorbent resin in an indefinite ground form and more preferably satisfies one or more of the following conditions (i) to (iii):

(i) the water-absorbent resin in an indefinite ground form has been obtained by performing surface-crosslinking on the pre-surface-crosslinking water-absorbent resin with an organic surface-crosslinking agent;
(ii) the moisture content of the water-absorbent resin is not higher than 10% by mass; and
(iii) the specific surface area of the water-absorbent resin is not lower than 25 $m^2/kg$ and the proportion of the particles that pass through the sieve having a mesh opening size of 150 µm to the entire water-absorbent resin is not higher than 3% by mass.

(i) Water-Absorbent Resin in Indefinite Ground Form has been Obtained by Performing Surface-Crosslinking on Pre-Surface-Crosslinking Water-Absorbent Resin with Organic Surface-Crosslinking Agent As described above, an organic surface-crosslinking agent is preferably used as the surface-crosslinking agent.

(ii) Moisture Content of Water-Absorbent Resin Is Not Higher Than 10% By Mass

It is generally known that, if the moisture content of a water-absorbent resin in an indefinite ground form is not higher than 10% by mass, dust is more likely to be generated owing to damage caused by friction or the like. However, the following surprising result has been obtained. That is, if an inorganic acid alkali metal salt powder is added to the water-absorbent resin, the dust generation amount is smaller than the dust generation amount in the case of adding no inorganic acid alkali metal salt powder. This advantageous effect is obtained also if the moisture content of the water-absorbent resin is preferably not higher than 10% by mass, more preferably not higher than 8% by mass, further preferably not higher than 5% by mass, and particularly preferably not higher than 4% by mass.

(iii) Specific Surface Area of Water-Absorbent Resin is not Lower than 25 $m^2/Kg$ and Proportion of Particles that Pass Through Sieve Having Mesh Opening Size of 150 µm to Entire Water-Absorbent Resin is not Higher than 3% By Mass By the above grinding, the specific surface area of the water-absorbent resin is increased, but an end portion of the resin is more likely to be damaged owing to wear or the like. If the specific surface area of the water-absorbent resin is not lower than 25 $m^2/kg$, dust is particularly likely to be generated. However, if an inorganic acid alkali metal salt powder having a predetermined particle diameter is added to the water-absorbent resin, the dust generation amount is smaller than in the case of adding no inorganic acid alkali metal salt powder. This advantageous effect is obtained also if the specific surface area of the water-absorbent resin is preferably not lower than 25 $m^2/kg$, more preferably not lower than 27 $m^2/kg$, and further preferably not lower than 30 $m^2/kg$. Meanwhile, if the need for maintaining the strength of the water-absorbent resin and retaining the form thereof is considered, the specific surface area is preferably not higher than 50 $m^2/kg$ and more preferably not higher than 45 $m^2/kg$.

A water-absorbent resin or a water absorbent agent having a smaller particle size has a higher specific surface area. In the present invention, a water-absorbent resin with a small amount of the above fine powder, is preferably used. Especially, a water-absorbent resin in which the proportion of the particles smaller than 150 µm is preferably not higher than 3% by mass and more preferably not higher than 2% by mass, is used.

The above conditions (i) to (iii) can be appropriately adopted in combination. It is preferable to select any one of the conditions (i) to (iii), any two of the conditions (i) to (iii), or all of the conditions. For example, in the case of the conditions (ii) and (iii), dust is more likely to be generated, but, if an inorganic acid alkali metal salt powder having a predetermined particle diameter is added, the dust generation amount is smaller than the dust generation amount in the case of adding no inorganic acid alkali metal salt powder.

[2-8-1] Inorganic Acid Alkali Metal Salt

As the inorganic acid alkali metal salt, a water-insoluble salt or a water-soluble salt is used, and a water-soluble salt, particularly, an inorganic acid alkali metal salt that dissolves by at least 1 g per 100 g of water at 25° C., is preferably used.

The inorganic acid alkali metal salt may be an oxidizing salt, a reducing salt, or a non-oxidizing and non-reducing salt. A reducing inorganic acid alkali metal salt or a non-oxidizing and non-reducing inorganic acid alkali metal salt is preferably used. The inorganic acid alkali metal salt may be obtained by converting all the acid groups in an inorganic acid to salts, or may be a hydrogen salt in which some of the acid groups have been converted to salts.

Examples of the reducing inorganic acid alkali metal salt include: alkali metal sulfites such as sodium sulfite, potassium sulfite, and lithium sulfite; alkali metal bisulfites such as sodium bisulfite, potassium bisulfite, and lithium bisulfite; alkali metal pyrosulfites such as sodium pyrosulfite, potassium pyrosulfite, and lithium pyrosulfite; alkali metal sulfates such as sodium bisulfate, potassium sulfate, and lithium sulfate; alkali metal thiosulfates such as sodium thiosulfate, potassium thiosulfate, and lithium thiosulfate (and hydrates of the alkali metal thiosulfates); alkali metal phosphites such as sodium phosphite and sodium hydrogen phosphite; alkali metal hypophosphites such as sodium hypophosphite and sodium hydrogen hypophosphite; and the like.

Examples of the non-reducing inorganic acid alkali metal salt include: alkali metal carbonates such as sodium carbonate, potassium carbonate, and lithium carbonate; alkali metal bicarbonates such as sodium bicarbonate, potassium bicarbonate, and lithium bicarbonate; the above alkali metal carbonates and the above alkali metal bicarbonates such as sodium carbonate and sodium bicarbonate; alkali metal hydrochlorides such as sodium chloride, potassium chloride, and lithium chloride; alkali metal anhydrous dibasic phosphates such as anhydrous dibasic sodium phosphate and anhydrous dibasic lithium phosphate; and the like.

If an effect of suppressing generation of dust and cost are considered, preferable ones of these inorganic acid alkali metal salts are: sodium salts such as sodium sulfite, sodium bisulfite, sodium bisulfate, sodium thiosulfate and hydrates thereof, sodium carbonate, sodium bicarbonate, sodium carbonate and sodium bicarbonate, and anhydrous dibasic sodium phosphate; potassium salts such as potassium carbonate, potassium chloride, and potassium sulfate; and lithium salts such as lithium carbonate.

In addition, the reducing inorganic acid alkali metal salts, specifically, sulfur-containing alkali metal salts such as alkali metal bisulfites, alkali metal sulfites, alkali metal pyrosulfites, alkali metal sulfates, and alkali metal thiosulfates, exhibit an effect of preventing coloring over time and an effect of preventing gel degradation, and also enable reduction in the dust generation amount. Thus, the reducing inorganic acid alkali metal salts are preferable. In the present invention, a powder of the above inorganic acid alkali metal salt is preferably at least one type selected from the group consisting of carbonates, bicarbonates, sulfates, bisulfates, sulfites, bisulfites, phosphates, hydrogen phosphates, and chlorides thereof.

In the present invention, a powder of the above inorganic acid alkali metal salt is used. As a result of studies conducted by using alkali metal salt powders having different particle sizes by the present inventors, the advantageous effect of the present invention, i.e., reduction in generation of dust, was exhibited only in the case of using fine inorganic acid alkali metal salt powders. The mass-average particle diameter D50, of the above inorganic acid alkali metal salt powder, that is defined in sieve classification is preferably not larger than 200 μm, more preferably not larger than 150 μm, and further preferably not larger than 100 μm. Regarding the lower limit, the mass-average particle diameter D50 is not smaller than 50 μm and more preferably not smaller than 75 μm if handleability is considered.

The addition amount of the inorganic acid alkali metal salt powder (or, in the case of using two or more types of inorganic acid alkali metal salt powders in combination, the total amount thereof) relative to 100 parts by mass of the water-absorbent resin to which the inorganic acid alkali metal salt powder has not yet been added, is essentially not lower than 0.06 parts by mass, preferably not lower than 0.1 parts by mass, more preferably not lower than 0.3 parts by mass, and further preferably not lower than 0.5 parts by mass, and meanwhile, the addition amount is not higher than 5 parts by mass, preferably not higher than 3 parts by mass, and more preferably not higher than 1 part by mass.

If the use amount of the inorganic acid alkali metal salt powder is excessively low, a sufficient effect of suppressing dust may not be obtained. Meanwhile, if the use amount of the inorganic acid alkali metal salt powder is excessively high, the dust amount is increased, whereby water absorption performance may decrease. In the present invention, a post-decrease dust proportion defined by a dust amount after addition of the inorganic acid alkali metal salt powder with respect to a dust amount before addition of the inorganic acid alkali metal salt powder, is preferably lower than 100%, more preferably not higher than 90%, and further preferably not higher than 80%.

When the inorganic acid alkali metal salt powder is mixed with the above water-absorbent resin, a specific mixing method can involve use of a known stirring device to perform mixing. Specifically, a paddle blender, a ribbon mixer, a rotary blender, a jar tumbler, a plunger mixer, a mortar mixer, or the like can be used to perform mixing. The rotation rate thereof is preferably not lower than 5 rpm and more preferably not lower than 10 rpm, and meanwhile, the rotation rate is preferably not higher than 10000 rpm and more preferably not higher than 2000 rpm.

Each of these stirring devices may include a heating device for heating a mixture of the above water-absorbent resin and the above inorganic acid alkali metal salt powder and may include a cooling device for cooling the above mixture heated by the heating device. A stirring time is not particularly limited, and is preferably not longer than 60 minutes and more preferably not longer than 30 minutes.

The method for mixing the inorganic acid alkali metal salt powder may involve mixing the inorganic acid alkali metal salt powder in steps subsequent to the surface-crosslinking without separately providing any mixing step. In manufacturing processes for water-absorbent resins, steps are made successive by pneumatic transportation or a conveying machine such as a screw feeder in many cases. In these conveying steps, the inorganic acid alkali metal salt powder may be mixed simultaneously with conveyance of the water-absorbent resin, or the inorganic acid alkali metal salt powder may be mixed in a classification step or in an aggregate grinding step which are subsequent to the surface-crosslinking.

The above water-absorbent resin and the inorganic acid alkali metal salt powder are particulate powders, and it is important to prevent aggregation at the time of mixing therebetween. Thus, when or after the above inorganic acid alkali metal salt powder and water-absorbent resin are mixed with each other, the above inorganic acid alkali metal salt powder and water-absorbent resin are preferably pneumatically transported. By the pneumatic transportation, aggregation of the water-absorbent resin and the inorganic acid alkali metal salt powder can be prevented. Therefore, the inorganic acid alkali metal salt powder can be more evenly mixed with the water-absorbent resin, and the physical properties of the water absorbent agent that is obtained can be increased.

When the inorganic acid alkali metal salt powder is added, at least one type selected from the group consisting of other additives such as chelating agents, plant components, antibacterial agents, water-soluble macromolecules, and inorganic salts described later may be further added together with the inorganic acid alkali metal salt powder or separately from the inorganic acid alkali metal salt powder. In addition, a binder such as water or a polyol may be used as necessary. In this case, the additive content is appropriately selected as necessary and is set to be not lower than 0.001% by mass and not higher than 50% by mass of the inorganic acid alkali metal salt powder. As the above chelating agents, chelating agents having high ion sequestering ability or chelation ability for Fe and Cu are preferable. Specifically, examples of the chelating agents include a chelating agent of which the stability constant for Fe ions is not smaller than 10, preferable examples of the chelating agents include a chelating agent of which the stability constant for Fe ions is not smaller than 20, further preferable examples of the chelating agents include an amino-polycarboxylic acid and a salt thereof, and particularly preferable examples of the chelating agents include an amino carboxylic acid having 3 or more carboxyl groups, and a salt thereof. Specific examples of these polycarboxylic acids include diethylenetriaminepentaacetic acid, triethylenetetraaminehexaacetic acid, cyclohexane-1,2-diamine tetraacetic acid, N-hydroxyethylethylenediaminetriacetic acid, ethylene glycol diethyl ether diamine tetraacetic acid, ethylenediamine tetrapropionic acetic acid, N-alkyl-N'-carboxymethyl aspartic acid, N-alkenyl-N'-carboxymethyl aspartic acid, and alkali metal salts, alkali earth metal salts, ammonium salts, and amine salts thereof. The salts may result from complete neutralization, may result from partial neutralization, or may be mixtures. Among these polycarboxylic acids, diethylenetriaminepentaacetic acid, triethylenetetraaminehexaacetic acid, N-hydroxyethylethylenediaminetriacetic acid, and salts thereof are most preferable. The use amount thereof relative to 100 parts by mass of the water-absorbent resin is preferably not lower than 0.00001 parts by mass and more preferably not lower than 0.0001 parts by mass, and meanwhile, the use amount is preferably not higher than 10 parts by mass and more preferably not higher than 1 part by mass.

For exhibiting deodorization property, the above plant component can be blended such that the amount thereof relative to 100 parts by mass of the water-absorbent resin is within a range of preferably not lower than 0 parts by mass, more preferably not lower than 0.001 parts by mass, and further preferably not lower than 0.002 parts by mass, and meanwhile, preferably not higher than 10 parts by mass, more preferably not higher than 5 parts by mass, and further preferably not higher than 3 parts by mass. The plant component is preferably at least one type of compound selected from among polyphenols, flavones and analogs thereof, and caffeine. The plant component is more preferably at least one type of compound selected from among tannin, tannic acid, gall, nutgall, and gallic acid. The above antibacterial agent is a conventionally known antibacterial agent having antibacterial property, and examples of the antibacterial agent include antibacterial agents described in Japanese Laid-Open Patent Publication No. H11-267500. When these chelating agents, plant components, antibacterial agents, water-soluble macromolecules, inorganic salts, and the like are added to the water-absorbent resin, it is preferable to select an adding method that suppresses decrease in the solid content as much as possible.

In the present invention, heating and drying treatment may be performed, as necessary, on the above water-absorbent resin to and with which the inorganic acid alkali metal salt powder has been added and mixed. Specifically, if the moisture content of the water-absorbent resin is higher than 10% by mass, the heating and drying treatment may be performed. Meanwhile, in the present invention, the inorganic acid alkali metal salt powder has been dry-blended, and thus the water-absorbent resin has a low moisture content as compared to the case of conventional addition of an aqueous solution. Especially, in a conventional case, heating and drying treatment has been essentially performed to set the moisture content of the water-absorbent resin to be not higher than 10% by mass. However, as described above, the moisture content of the water-absorbent resin of the present invention is low and preferably not higher than 10% by mass, and thus heating and drying treatment is not an essential treatment. Therefore, the present invention makes it possible to decrease cost for work required for the heating and drying treatment. Even if the heating and drying treatment is performed, since the moisture content of the water-absorbent resin is lower than in the conventional case, the moisture content can be decreased by a short-time heating and drying treatment. In addition, the feature in which water or an aqueous liquid is not added to the above water-absorbent resin to and with which the inorganic acid alkali metal salt powder has been added and mixed, is also useful as a measure for setting the moisture content to be not higher than 10% by mass.

[2-9] Other Steps

In the present invention, a granulating step, a sizing step, a fine powder removing step, a fine powder collecting step, a fine powder recycling step, an iron removing step, and the like can be performed, as necessary, in addition to the above steps. In addition, the present invention may further include at least one type of step selected from among a transporting step, a storing step, a packing step, a keeping step, and the like.

The above granulating step may be, for example, a step of making the fine powder, which has been obtained in the fine powder collecting step, into a hydrous gel. The above sizing step includes: a step of classifying and removing a fine powder subsequently to the surface-crosslinking step; a step of performing classification and pulverization if the water-absorbent resin aggregates so as to have a size larger than a desired size; and the like. The above fine powder recycling step may be a step of adding a fine powder to the hydrous gel or the like which is a raw material in any of the steps in the manufacturing process for the water-absorbent resin, the addition being performed directly or after the fine powder is made into a large hydrous gel by the above granulating step.

For example, the particles having particle diameters smaller than 150 μm may be separated and removed from the water absorbent agent having been added the inorganic acid alkali metal salt powder, and the removed particles may be recycled in the manufacturing process for the water-absorbent resin. The fine powder recycling step preferably includes separating, after performing the above curing, the particles having particle diameters smaller than 150 μm and returning the particles smaller than 150 μm to the manufacturing process for the water-absorbent resin, to recycle the particles as a raw material for the water-absorbent resin. The fine powder recycling step preferably includes supplying the fine particles to a step preceding to drying.

The water absorbent agent having been added the inorganic acid alkali metal salt powder, may be stored in a storing tank. The present invention preferably includes, after the heating and drying step and preferably after the above curing, a step of retaining the obtained water absorbent agent in a storing tank for not shorter than 1 minute and not longer than 20 hours. If the water absorbent agent is temporarily stored in the storing tank, odor and a residual monomer that are residual in the water absorbent agent can be removed during the storing. The retaining time in the storing tank is more preferably not shorter than 5 minutes and further preferably not shorter than 10 minutes, and meanwhile, the retaining time is more preferably not longer than 18 hours and further preferably not longer than 15 hours. An excessively long retaining time in the storing tank requires the size of the storing tank to be excessively large relative to production quantity, and thus is economically disadvantageous. Meanwhile, an excessively short retaining time in the storing tank is, depending on production quantity, not preferable because it does not serve as a cushion tank for the purpose of installing the storage tank.

The present invention can include, after the above step of retaining the water absorbent agent in the storing tank, a step of filling a product shipping container with the water absorbent agent. A predetermined amount of the water absorbent agent is separated from the storing tank, and a bag or a container is filled with the separated water absorbent agent as a final product.

[3] Water-Absorbent Resin and Water Absorbent Agent

The water absorbent agent manufactured as described above is regarded as a final product if the water absorbent agent is in a state of being able to be shipped. The water absorbent agent of the present invention is a water absorbent agent containing the surface-crosslinked water-absorbent resin in an indefinite ground form as a main component and having a surface on which the inorganic acid alkali metal salt powder is disposed.

The phrase "water absorbent agent . . . having a surface on which the inorganic acid alkali metal salt powder is disposed" refers to: a state in which the inorganic acid alkali metal salt powder is bonded to the surface of the water absorbent agent; or a state in which the inorganic acid alkali metal salt powder is at least partially visible on the surface of the water-absorbent resin. In the present invention, it can be observed, with a scanning electron microscope (SEM), that the alkali metal salt powder is present in particulate form on the surface of the water-absorbent resin.

[3-1] Relationship Between Water-Absorbent Resin and Water Absorbent Agent

The amount of the water-absorbent resin contained in the water absorbent agent with respect to the entire water absorbent agent amount is within the range of above [1-1], preferably not lower than 95% by mass, more preferably not lower than 98% by mass, and most preferably not lower than 99% by mass, and particularly preferably 100% by mass. In the case where the amount is not 100% by mass, the remaining components can include, for example, the above various additives.

[3-2] Characteristics of Water Absorbent Agent

The water absorbent agent of the present invention preferably has at least one of the following characteristics (a) to (m):

(a) the mass-average particle diameter D50; (b) the proportion of the particles having particle diameters smaller than 150 μm; (c) the absorption capacity under no load (CRC); (d) the absorption capacity under load (AAP); (e) the moisture content; (f) the water absorption time (Vortex method); (g) the amount of polyhydric alcohols; (h) specific surface area; (i) coloring degree; (j) inorganic acid alkali metal salt powder content; (k) type of inorganic acid alkali metal salt powder; (l) surface tension and (m) dust amount.

Any two or more of the above characteristics (a) to (m) may be combined. It is preferable that at least the characteristics (e) is combined, and it is more preferable that the characteristics (b) and (h) are combined in addition to these characteristics. It is further preferable that the characteristics (g) and/or (m) may be combined in addition to these characteristics, and the characteristics (k) and/or (l) may be combined in addition to these characteristics. It is most preferable that all of the characteristics (a) to (m) are combined.

[3-2-1] Mass-Average Particle Diameter D50

The mass-average particle diameter D50 of the water absorbent agent is preferably not smaller than 200 μm, more preferably not smaller than 250 μm, and further preferably not smaller than 300 μm, and meanwhile, the mass-average particle diameter D50 is preferably not larger than 600 μm, more preferably not larger than 550 μm, and further preferably not larger than 500 μm. For detailed measurement conditions, EXAMPLES are referred to. If the mass-average particle diameter D50 of the water absorbent agent is set to fall within the above range, the absorption capacity under load AAP and the Vortex-method-based water absorption time which are preferable absorption characteristics can be controlled in a further balanced manner. If the mass-average particle diameter D50 is excessively small, a gel bulk density may be excessively increased, or the absorption capacity under load AAP which is a preferable absorption characteristic may be excessively reduced. Meanwhile, if the mass-average particle diameter D50 is excessively large, the Vortex-method-based water absorption time which is a preferable absorption characteristic may become excessively short. In addition, the coarseness of the particles of the water absorbent agent stands out. Thus, when the water absorbent agent is used for an absorbent article such as a disposable diaper or a sanitary napkin, the texture or the feel of wearing may be worsened.

[3-2-2] Proportion of Particles Having Particle Diameters Smaller than 150 μm

The proportion of the particles smaller than 150 μm in 100% by mass of the water absorbent agent is preferably not higher than 3% by mass, more preferably not higher than 2% by mass, further preferably not higher than 1% by mass, and particularly preferably 0% by mass. It is noted that, in continuous commercial production, it is sometimes very difficult to set the proportion of the particles smaller than 150 μm to be 0% by mass from the viewpoint of production efficiency. Thus, the proportion is preferably not lower than 0.1% by mass, more preferably not lower than 0.2% by mass, and further preferably not lower than 0.3% by mass. If the proportion of the particles smaller than 150 μm is set to fall within the above range, it becomes easier to control the absorption capacity under load AAP and the Vortex-method-based water absorption time in a balanced manner. An excessively high proportion of the particles smaller than 150 μm may not only lead to excessive reduction in the absorption capacity under load AAP which is a preferable absorption characteristic but also cause a working environment to be worsened owing to scattering of dust in a place where the water absorbent agent is handled and cause handleability to deteriorate owing to accumulation of fine particles in a device because the absolute amount of dust also increases even with a water absorbing agent to which the scattering of dust suppressing effect of the inorganic acid alkali metal salt of the present invention is applied, and thus is not preferable.

In addition, it is preferable that the water absorbent agent satisfies the above range of the mass-average particle diameter D50 and satisfies the above range of the proportion of the particles smaller than 150 μm. By satisfying both ranges, the above effects are synergistically obtained. The mass-average particle diameter D50 of the water absorbent agent and the proportion of the particles smaller than 150 μm are measured by methods described in EXAMPLES.

[3-2-3] Absorption Capacity Under No Load CRC

The absorption capacity under no load CRC of the water absorbent agent is preferably not lower than 25 g/g, and meanwhile, the CRC is preferably not higher than 40 g/g, more preferably not higher than 38 g/g, further preferably not higher than 35 g/g, particularly preferably not higher than 32 g/g, and most preferably not higher than 30 g/g. If the above absorption capacity under no load CRC is excessively low, the absorption capacity of the water absorbent agent is reduced, whereby the water absorbent agent may be unsuitable for being used for an absorber of an absorbent article such as a disposable diaper or a sanitary napkin. Meanwhile, if the above absorption capacity under no load CRC is excessively high, the gel strength may be weakened. The absorption capacity under no load CRC of the present invention is measured by methods described in EXAMPLES.

[3-2-4] Absorption Capacity Under Load AAP

The "AAP" is an abbreviation for Absorption Against Pressure and means the absorption capacity under load of the water absorbent agent. In the present invention, the absorption capacity under load AAP of the water absorbent agent is preferably not lower than 20 g/g, more preferably not lower than 21 g/g, further preferably not lower than 22 g/g, and particularly preferably not lower than 23 g/g, and meanwhile, the AAP is preferably not higher than 30 g/g and more preferably not higher than 28 g/g. If the absorption capacity under the load AAP is set to fall within the above range, a liquid return amount at application of load to the absorber can be further reduced, whereby the water-absorbent resin or the water absorbent agent becomes suitable for being used for an absorber of an absorbent article such as a disposable diaper or a sanitary napkin.

[3-2-5] Vortex-Method-Based Water Absorption Time

The Vortex-method-based water absorption time of the water absorbent agent is preferably not longer than 45 seconds, more preferably not longer than 40 seconds, and further preferably not longer than 35 seconds, and meanwhile, the Vortex-method-based water absorption time is preferably longer than 10 seconds and more preferably not shorter than 20 seconds. If the above Vortex-method-based water absorption time is excessively long, the obtained water absorbent agent has a long water absorption time for a body fluid such as urine or blood or the like and may be unsuitable for an absorber of an absorbent article such as a disposable diaper. The Vortex-method-based water absorption time can be controlled with foaming polymerization, a particle size distribution, or the like. The Vortex-method-based water absorption time of the present invention is measured by methods described in EXAMPLES.

[3-2-6] Moisture Content

The moisture content of the water absorbent agent is preferably not higher than 10% by mass, more preferably not higher than 9% by mass, further preferably not higher than 8% by mass, and particularly preferably not higher than 7% by mass, and meanwhile, the moisture content is preferably not lower than 0.1% by mass and more preferably not lower than 0.3% by mass. If the moisture content is excessively low, the damage resistance of the water absorbent agent may decrease. Meanwhile, if the moisture content is excessively high, the water absorption performance decreases and the adhesiveness increases, whereby it may become difficult to handle the water absorbent agent. The moisture content in the present invention is a value measured according to a method described in EXAMPLES.

[3-2-7] Amount of Polyhydric Alcohols

The total amount of the polyhydric alcohols in the water absorbent agent with respect to the amount of the entire water absorbent agent is, on a mass basis, preferably not higher than 15000 ppm, more preferably not higher than 12000 ppm, and further preferably not lower than 10000 ppm. The lower limit of the total amount is preferably 0 ppm. In the case of using at least one type of surface-crosslinking agent selected from among polyhydric alcohols or alkylene carbonates, a removal step of performing a cleanse with water or an organic solvent is separately required in order to set the total amount to 0 ppm, and thus production efficiency decreases in commercial production. Considering this, the total amount does not have to be 0 ppm and may be, for example, not lower than 100 ppm. Meanwhile, if the amount of residual polyhydric alcohols is excessively high with respect to the water absorbent agent, the risk of causing rough skin owing to the residues may be intensified.

[3-2-8] Specific Surface Area

If the specific surface area of the water absorbent agent is set to be preferably not lower than 25 m$^2$/kg, an even more excellent Vortex-method-based water absorption time is obtained. The specific surface area is more preferably not lower than 27 m$^2$/kg and further preferably not lower than 30 m$^2$/kg. Although a higher specific surface area is more desirable from the viewpoint of improving the water absorption time, excessive increase in the specific surface area makes it necessary to perform excessive foaming polymerization in the polymerization step and excessively fine gel grinding in the gel grinding step. As a result, the absorption capacity under load AAP which is a preferable absorption characteristic may decrease. The specific surface area is preferably not higher than 50 m$^2$/kg, more preferably not higher than 47 m$^2$/kg, and further preferably not higher than 45 m$^2$/kg. The specific surface area in the present invention is a value measured according to a method described in EXAMPLES.

Especially, it is preferable, in the present invention, that: the specific surface area of the water absorbent agent is not lower than 25 m$^2$/kg; and the proportion of the particles that pass through the sieve having a mesh opening size of 150 μm to the entire water absorbent agent is not higher than 3% by mass. In addition, the above suitable ranges are applied to this combination.

[3-2-9] Coloring Degree

If the water absorbent agent in a state of being contained in a disposable diaper or the like is exposed under a condition of a low airtightness for a long time in a warehouse or the like at high temperature and high humidity, e.g., in a tropical or subtropical zone, coloring may occur owing to influence of Fe cations and polyvalent metal cations in the water absorbent agent, and the coloring degree may decrease.

Such decrease in the coloring degree is also called coloring over time. The coloring degree can be represented by an L-value (lightness) in the Hunter Lab color system, and a larger value indicates less coloring. Decrease in the coloring degree can be assessed in a prompting test in which a condition is set to be harsher than in an actual environment. A post-prompting-test coloring degree of the water absorbent agent can be set to fall within the above range by, for example: a technique of adding a coloring prevention agent to the water-absorbent resin; a technique of controlling the amount of iron which is a substance causing coloring; or the like. The water absorbent agent is ordinarily used in a state of having a high concentration or a high weight in an absorbent article such as a disposable diaper. Thus, if the above post-prompting-test coloring degree in terms of L-value is excessively low, in the case where the water absorbent agent is applied to an absorber for an absorbent article such as a disposable diaper, the appearance of the absorbent article deteriorates when the absorbent article is stored for a long period under a condition of high humidity and high temperature. Consequently, the commercial value of the absorbent article may be decreased. The post-prompting-test coloring degree, in terms of L-value, of the water absorbent agent is preferably not smaller than 80, more preferably not smaller than 81, and further preferably not smaller than 83. For detailed measurement conditions, EXAMPLES are referred to.

[3-2-10] Inorganic Acid Alkali Metal Salt Powder Content

The inorganic acid alkali metal salt powder content of the above water absorbent agent relative to 100 parts by mass of the water absorbent agent is preferably not lower than 0.06 parts by mass and not higher than 5 parts by mass. The inorganic acid alkali metal salt content, of the water absorbent agent, that is defined in a measurement method described later is preferably not lower than 0.1 parts by mass, more preferably not lower than 0.3 parts by mass, and further preferably not lower than 0.5 parts by mass, and meanwhile, the inorganic acid alkali metal salt content is preferably not higher than 3 parts by mass and more preferably not higher than 1 part by mass. If the above inorganic acid alkali metal salt component is excessively detected, a physical property regarding absorption decreases. In addition, alkali metal salts that have failed to be bonded to the absorbing agent become dust, whereby the dust amount increases. Thus, such an excessive inorganic acid alkali metal salt component is not preferable.

[3-2-11] Type of Inorganic Acid Alkali Metal Salt Powder

In the present invention, the above inorganic acid alkali metal salt powder in the water absorbent agent is preferably at least one type selected from the group consisting of carbonates, bicarbonates, sulfates, bisulfates, sulfites, bisulfites, phosphates, hydrogen phosphates, and chlorides thereof.

In addition, the form of the water absorbent agent of the present invention is preferably an indefinite ground form, as already mentioned.

[3-2-12] Dust Amount

A dust amount, of the water absorbent agent of the present invention, that is defined by a 30-minute value obtained with a Heubach DUSTMETER is preferably not higher than 150 mg/kg. The dust amount is more preferably not higher than 140 mg/kg and further preferably not higher than 130 mg/kg. That is, the water absorbent agent of the present invention is preferably manufactured in a working environment in which this dust amount is low. If the dust amount is preferably not higher than 150 mg/kg at the time of manufacturing the water absorbent agent, dust scattering in the working environment occurs only in such a level that the dust is not visually recognizable. In addition, problems such as clogging in a filter of a dust collector is less likely to occur, whereby workability is also improved. From the above viewpoint, the above dust amount is ideally 0 mg/kg. However, in terms of cost, the dust amount only has to be preferably not lower than 10 mg/kg, more preferably not lower than 20 mg/kg, and further preferably not lower than 30 mg/kg. Further, the amount of dust that is present in the air of the working atmosphere and that could be a problem in terms of safety and sanitation, can also be decreased. The dust amount indicates a value measured in measurement mode Type II by the Heubach DUSTMETER. For detailed measurement conditions, EXAMPLES are referred to.

Such a water absorbent agent has an excellent low-dust property, and thus it is possible to decrease the amount of dust to which a worker could be exposed and which could be a problem in terms of safety and sanitation. Therefore, the working environment can be improved at the time of manufacturing a product made by using the water absorbent agent, e.g., a disposable diaper.

[3-2-13] Surface Tension

The surface tension of the water absorbent agent that is obtained is preferably not smaller than 60 N/m, more preferably not smaller than 65 N/m, and further preferably not smaller than 70 N/m. In the method of the present invention, the dust amount can be decreased without decreasing the surface tension.

[4] Use of Water Absorbent Agent

It is preferable that the water absorbent agent according to the present invention is mainly used for an absorber or an absorption layer (hereinafter, collectively referred to as "absorber") of an absorbent article such as a disposable diaper or a sanitary napkin. It is more preferable that the water absorbent agent is used for an absorber of an absorbent article such that the use amount of the water absorbent agent per absorbent article is large.

The above absorber means a product obtained by shaping the particulate water absorbent agent into a sheet form, a fiber form, a tubular form, or the like, and the particulate water absorbent agent is preferably shaped into a sheet form, to be an absorption layer. In addition to the water absorbent agent according to the present invention, an absorbent material such as pulp fibers, an adhesive, a nonwoven fabric, and the like may also be used in combination for the shaping. In this case, the amount of the water absorbent agent in the absorber (hereinafter, written as a "core concentration") is preferably not lower than 50% by mass, more preferably not lower than 60% by mass, further preferably not lower than 70% by mass, and particularly preferably not lower than 80% by mass, and meanwhile, the core concentration is preferably not higher than 100% by mass.

If the core concentration is set to fall within the above range, use of the above absorber for an absorbent article enables, even when the water absorbent agent is made into a gel by absorbing urine, appropriate spaces to be formed among particles of the gel.

[5] Absorbent Article

An absorbent article according to the present invention includes the above absorber and ordinarily has a liquid permeable front surface sheet and a liquid non-permeable back surface sheet. Examples of the absorbent article include disposable diapers, sanitary napkins, and the like.

In the case where the absorbent article is, for example, a disposable diaper, the disposable diaper is made by interposing an absorber containing the water absorbent agent of the present invention between a liquid permeable top sheet located so as to come into contact with the skin of a person when the disposable diaper is worn and a liquid non-permeable back sheet located outward when the disposable diaper is worn. The disposable diaper is further provided with a member known to a person skilled in the art, such as adhesive tape for fixing the disposable diaper after being worn.

In the absorbent article according to the present invention, when the absorber absorbs a liquid and the water absorbent agent swells and is made into a gel, appropriate spaces are formed among particles of the gel and pleasant aroma is emitted through the spaces. Thus, an absorption article comfortable to a wearer and his/her care giver can be provided.

The water absorbent agent according to the present invention can be suitably used for, besides the above disposable diaper and sanitary napkin, a pet urine absorbing agent, a urine gelling agent for portable toilets, or the like.

In the present invention, measurement methods for the above physical properties are based on measurement methods described in EXAMPLES, unless otherwise specified.

The present application claims priority to Japanese Patent Application No. 2019-003361 filed on Jan. 11, 2019, the entire contents of which are incorporated herein by reference.

EXAMPLES

Hereinafter, the present invention will be more specifically described by means of examples. However, the present invention is not limited by the following examples, and, as a matter of course, can also be carried out with appropriate modifications being made within the scope of the gist described above and below, and any of these modifications are included in the technical scope of the present invention.

Production of Water-Absorbent Resin

[Production Example 1]
A water-absorbent resin was produced under the following production conditions.
Monomer Solution Preparation Step
421.7 g of acrylic acid, 2.4 g of polyethylene glycol diacrylate (the average number of polyethylene glycol units (average n number): 9), 11.3 g of a 1.0%-by-mass aqueous solution of trisodium diethylenetriamine pentaacetate, 140.4 g of a 48.5%-by-mass aqueous solution of sodium hydroxide, and 394.7 g of deionized water, i.e., ion-exchanged water, were poured into a container having a volume of 2 L and made from polypropylene, and were mixed, whereby a monomer aqueous solution (a') was made. The liquid temperature of the monomer aqueous solution (a') was increased to 62.5° C. owing to heat of a first stage of neutralization immediately subsequent to the making.

Subsequently, the above monomer aqueous solution (a') was cooled while being stirred. At a time point at which the liquid temperature became 38° C., 211.9 g of a 48.5%-by-mass aqueous solution of sodium hydroxide having a temperature adjusted to 40° C. was added to and mixed with the above monomer aqueous solution (a') over about 30 seconds, whereby a monomer aqueous solution (a) was prepared. The liquid temperature of the monomer aqueous solution (a) was increased to 81.0° C. owing to heat of a second stage of neutralization immediately subsequent to the preparation. Although a precipitate was observed at the start of the mixing of the 48.5%-by-mass aqueous solution of sodium hydroxide, the precipitate was gradually dissolved. Consequently, a transparent homogeneous solution was obtained.
Polymerization Step
A Kinoshita type glass ball filter (filter particle No. 4/manufactured by Kinoshita Rika Kogyo Co., Ltd.) was used for the above monomer aqueous solution (a), and nitrogen gas was introduced into the monomer aqueous solution (a) at 0.1 L/minute for 5 seconds. Further, 17.6 g of a 4.0%-by-mass aqueous solution of sodium persulfate was added to the above monomer aqueous solution (a) being stirred, and then stirring was performed for about 5 seconds. Thereafter, in a system open to the atmosphere, the monomer aqueous solution (a) was poured into a vat type container (bottom surface: 340×340 mm, height: 25 mm, inner surface: coated with Teflon (registered trademark)) made of stainless steel. The vat type container had been heated in advance until the surface temperature thereof was 50° C., by using a hot plate.

A polymerization reaction was initiated 57 seconds after the above monomer aqueous solution (a) was poured into the vat type container. The polymerization reaction progressed such that the monomer aqueous solution (a) expanded and foamed in all directions while generating steam. Then, the resultant substance was contracted to a size slightly larger than that of the vat type container. After the elapse of 3 minutes from the initiation of the polymerization reaction, a crosslinked polymer in the form of a hydrous gel (hereinafter, referred to as a "hydrous gel") (1) was taken out. The series of operations were performed in the system open to the atmosphere, and the peak temperature obtained during the polymerization was 110° C.
Gel Grinding Step
The hydrous gel (1) obtained through the above polymerization reaction was subjected to gel grinding by using a meat chopper (HL-G22S, plate bore diameter: 8.0 mm/manufactured by REMACOM Co., LTD.), whereby a particulate hydrous gel (1) was obtained. The rate of supply of the hydrous gel (1) into the above meat chopper was 230 g/minute. In addition, deionized water having a temperature adjusted to 90° C. was added at 50 g/minute concurrently with the supply of the hydrous gel (1).

In the gel grinding step of Production Example 1, the gel grinding energy 2 (GGE (2)) was 9 J/g, the mass-average particle diameter D50 of the particulate hydrous gel (1) was 900 μm, and the logarithmic standard deviation σζ of a particle size distribution of the particulate hydrous gel (1) was 1.10.
Drying Step
The particulate hydrous gel (1) obtained through the above operations was placed, in a spread manner, on a wire mesh made of stainless steel and having a mesh opening size of 300 μm, i.e., having 50 meshes, and hot air was caused to flow at 190° C. for 30 minutes to dry the particulate hydrous gel (1), whereby a dried polymer (1) was obtained.
Classification Step
Subsequently, the dried polymer (1) obtained through the drying operation was ground by using a roll mill (WML type roll grinder/manufactured by Inokuchi Giken Ltd.), and then was classified by using JIS standard sieves respectively having a mesh opening size of 710 μm and a mesh opening size of 45 μm.
Surface-Crosslinking Step
A surface-crosslinking agent solution (1) formed from 0.3 parts by mass of ethylene carbonate, 0.6 parts by mass of propylene glycol, 3.0 parts by mass of deionized water, i.e., ion-exchanged water, and 0.001 parts by mass (i.e., 10 ppm with respect to the pre-surface-crosslinking water-absorbent resin) of polyoxyethylene (20) sorbitan monostearate (manufactured by Kao Corporation), was added to and evenly mixed with 100 parts by mass of the pre-surface-crosslinking water-absorbent resin obtained as described above, whereby a mixture (1) was obtained. Thereafter, the mixture (1) was heated for about 40 minutes at 208° C., to perform surface-crosslinking. The obtained water-absorbent resin was crushed until the water-absorbent resin passed through a JIS standard sieve having a mesh opening size of 850 μm, whereby a post-surface-crosslinking water-absorbent resin (1) was obtained. The various physical properties of the obtained post-surface-crosslinking water-absorbent resin (1) are indicated in Table 1. The post-prompting-test coloring degree of the post-surface-crosslinking water-absorbent resin (1) was 81.9 in terms of L-value, 1.8 in terms of a-value, and 12.3 in terms of b-value. The total amount of the polyhydric alcohols of the post-surface-crosslinking water-absorbent resin (1) was 4970 ppm. This total amount of the polyhydric alcohols was not changed even after adding inorganic acid alkali metal salt powders in examples described later.

[Production Example 2]

A solution mixture (2) formed from 0.91 parts by mass of a 27%-by-mass aqueous solution of aluminum sulfate (8% by mass in terms of aluminum oxide), 0.27 parts by mass of a 60%-by-mass aqueous solution of sodium lactate, and 0.02 parts by mass of propylene glycol, was made.

1.2 parts by mass of the above solution mixture (2) was, while being stirred, added to 100 parts by mass of the post-surface-crosslinking water-absorbent resin (1) obtained in Production Example 1, and was evenly mixed for 1 minute. Thereafter, the mixture was dried for 30 minutes at 60° C. under a condition of causing no air flow. Subsequently, the dried mixture was caused to pass through the JIS standard sieve having a mesh opening size of 850 μm, whereby a post-surface-crosslinking water-absorbent resin (2) was obtained. The various physical properties of the obtained post-surface-crosslinking water-absorbent resin (2) are indicated in Table 1.

[Production Example 3]

The same operations as those in Production Example 1 were performed, except that, unlike in Production Example 1: the amount of polyethylene glycol diacrylate (molecular weight: 523) was changed from 2.4 g to 1.8 g; the amount of deionized water, i.e., ion-exchanged water, was changed from 394.7 g to 395.3 g; and classification was performed by using JIS standard sieves respectively having mesh opening sizes of 850 μm and 45 μm instead of the JIS standard sieves respectively having mesh opening sizes of 710 μm and 45 μm. Thus, a pre-surface-crosslinking water-absorbent resin in an indefinite ground form (3) was obtained. The same treatment as that in Production Example 1 was performed on the obtained pre-surface-crosslinking water-absorbent resin (3), whereby a post-surface-crosslinking water-absorbent resin (3) was obtained. The various physical properties of the obtained post-surface-crosslinking water-absorbent resin (3) are indicated in Table 1. The total amount of the polyhydric alcohols of the post-surface-crosslinking water-absorbent resin (3) was 4820 ppm. This total amount of the polyhydric alcohols was not changed even after adding inorganic acid alkali metal salt powders in examples described later.

TABLE 1

| | | Physical properties of pre-surface-crosslinking water-absorbent resins | | | | |
|---|---|---|---|---|---|---|
| | | Solid content [wt %] | D50 [μm] | σζ | Specific surface area [m²/kg] | Proportion of particles smaller than 150 μm [%] |
| Production Example 1 | Pre-surface-crosslinking water-absorbent resin | 96.7 | 432 | 0.38 | 32.0 | 1.3 |
| Production Example 2 | Pre-surface-crosslinking water-absorbent resin | 96.5 | 425 | 0.39 | 33.1 | 1.6 |
| Production Example 3 | Pre-surface-crosslinking water-absorbent resin | 96.0 | 450 | 0.45 | 29.8 | 0.7 |

Example 1

0.5 parts by mass of sodium bisulfite (manufactured by KANTO CHEMICAL Co., INC./special grade) was mixed with 100 parts by mass of the post-surface-crosslinking water-absorbent resin (1) obtained in Production Example 1. Specifically, 30 g of the above water-absorbent resin and the sodium bisulfite were put into a glass container having a volume of 225 ml, and then were vibrated (vibration time: 3 minutes at room temperature) with a paint shaker (manufactured by Toyo Seiki Seisaku-sho, Ltd.), to be mixed with each other, whereby a water absorbent agent (1) was obtained. The various physical properties of the obtained water absorbent agent (1) are indicated in Table 3. The post-prompting-test coloring degree of the water absorbent agent (1) was 85.0 in terms of L-value, 1.5 in terms of a-value, and 13.4 in terms of b-value.

Example 2

The same operations as those in Example 1 were performed, except that, unlike in the above Example 1, the addition amount of the sodium bisulfite was changed from 0.5 parts by mass to 1.0 part by mass. Thus, a water absorbent agent (2) was obtained. The various physical properties of the obtained water absorbent agent (2) are indicated in Table 3. The post-prompting-test coloring degree of the water absorbent agent (2) was 84.6 in terms of L-value, 1.5 in terms of a-value, and 15.3 in terms of b-value.

Example 3

The same operations as those in Example 1 were performed, except that, unlike in the above Example 1: the post-surface-crosslinking water-absorbent resin (1) was replaced with the post-surface-crosslinking water-absorbent resin (3) obtained in Production Example 3; and the addition amount of the sodium bisulfite was changed from 0.5 parts by mass to 1.0 part by mass. Thus, a water absorbent agent (3) was obtained. The various physical properties of the obtained water absorbent agent (3) are indicated in Table 3.

Example 4

The same operations as those in Example 1 were performed, except that, unlike in the above Example 1, the post-surface-crosslinking water-absorbent resin (1) was replaced with the post-surface-crosslinking water-absorbent resin (2) obtained in Production Example 2. Thus, a water absorbent agent (4) was obtained. The various physical properties of the obtained water absorbent agent (4) are indicated in Table 3.

Example 5

The same operations as those in Example 2 were performed, except that, unlike in the above Example 2, the sodium bisulfite was replaced with sodium sulfite (manufactured by KANTO CHEMICAL Co., INC./special grade). Thus, a water absorbent agent (5) was obtained. The various physical properties of the obtained water absorbent agent (5) are indicated in Table 3.

Example 6

The same operations as those in Example 1 were performed, except that, unlike in the above Example 1, the sodium bisulfite was replaced with sodium sulfate (manufactured by Wako Pure Chemical Co., INC./special grade). Thus, a water absorbent agent (6) was obtained. The various physical properties of the obtained water absorbent agent (6) are indicated in Table 3.

Example 7

The same operations as those in Example 1 were performed, except that, unlike in the above Example 1, the sodium bisulfite was replaced with sodium thiosulfate pentahydrate (manufactured by KANTO CHEMICAL Co., INC./special grade). Thus, a water absorbent agent (7) was obtained. The various physical properties of the obtained water absorbent agent (7) are indicated in Table 3.

Example 8

The same operations as those in Example 1 were performed, except that, unlike in the above Example 1, the sodium bisulfite was replaced with sodium carbonate (manufactured by Wako Pure Chemical Co., INC./special grade). Thus, a water absorbent agent (8) was obtained. The various physical properties of the obtained water absorbent agent (8) are indicated in Table 3.

Example 9

The same operations as those in Example 4 were performed, except that, unlike in the above Example 4, 0.5 parts by mass of the sodium bisulfite was replaced with 1.0 parts by mass of sodium carbonate (manufactured by Wako Pure Chemical Co., INC./special grade). Thus, a water absorbent agent (9) was obtained. The various physical properties of the obtained water absorbent agent (9) are indicated in Table 3.

Example 10

The same operations as those in Example 2 were performed, except that, unlike in the above Example 2, the sodium bisulfite was replaced with sodium bicarbonate (manufactured by Wako Pure Chemical Co., INC./special grade). Thus, a water absorbent agent (10) was obtained. The various physical properties of the obtained water absorbent agent (10) are indicated in Table 3.

Example 11

The same operations as those in Example 4 were performed, except that, unlike in the above Example 4, 0.5 parts by mass of the sodium bisulfite was replaced with 1.0 parts by mass of sodium bicarbonate (manufactured by Wako Pure Chemical Co., INC./special grade). Thus, a water absorbent agent (11) was obtained. The various physical properties of the obtained water absorbent agent (11) are indicated in Table 3.

Example 12

The same operations as those in Example 1 were performed, except that, unlike in the above Example 1, 0.5 parts by mass of the sodium bisulfite was replaced with 0.279 parts by mass of sodium carbonate (manufactured by Wako Pure Chemical Co., INC./special grade) and 0.221 parts by mass of sodium bicarbonate. Thus, a water absorbent agent (12) was obtained. The various physical properties of the obtained water absorbent agent (12) are indicated in Table 3.

Example 13

The same operations as those in Example 1 were performed, except that, unlike in the above Example 1, the sodium bisulfite was replaced with anhydrous dibasic sodium phosphate (manufactured by Wako Pure Chemical Co., INC./special grade). Thus, a water absorbent agent (13) was obtained. The various physical properties of the obtained water absorbent agent (13) are indicated in Table 3.

Example 14

The same operations as those in Example 1 were performed, except that, unlike in the above Example 1, the sodium bisulfite was replaced with potassium carbonate (manufactured by Wako Pure Chemical Co., INC./special grade). Thus, a water absorbent agent (14) was obtained. The various physical properties of the obtained water absorbent agent (14) are indicated in Table 3.

Example 15

The same operations as those in Example 1 were performed, except that, unlike in the above Example 1, the sodium bisulfite was replaced with potassium chloride (manufactured by Wako Pure Chemical Co., INC./special grade). Thus, a water absorbent agent (15) was obtained. The various physical properties of the obtained water absorbent agent (15) are indicated in Table 3.

Example 16

The same operations as those in Example 1 were performed, except that, unlike in the above Example 1, the sodium bisulfite was replaced with potassium sulfate (manufactured by Wako Pure Chemical Co., INC./special grade). Thus, a water absorbent agent (16) was obtained. The various physical properties of the obtained water absorbent agent (16) are indicated in Table 3.

Example 17

The same operations as those in Example 1 were performed, except that, unlike in the above Example 1, the sodium bisulfite was replaced with lithium carbonate (manufactured by KANTO CHEMICAL Co., INC./special grade). Thus, a water absorbent agent (14) was obtained. The various physical properties of the obtained water absorbent agent (14) are indicated in Table 3.

Comparative Example 1

The same operations as those in Example 1 were performed, except that, unlike in the above Example 1, the sodium bisulfite was replaced with barium sulfate (manufactured by Wako Pure Chemical Co., INC./extra pure). Thus, a comparative water absorbent agent (1) was obtained. The various physical properties of the obtained comparative water absorbent agent (1) are indicated in Table 3.

Comparative Example 2

The same operations as those in Example 1 were performed, except that, unlike in the above Example 1, the sodium bisulfite was replaced with magnesium sulfate (manufactured by KANTO CHEMICAL Co., INC./special grade). Thus, a comparative water absorbent agent (2) was obtained. The various physical properties of the obtained comparative water absorbent agent (2) are indicated in Table 3.

Comparative Example 3

The same operations as those in Example 2 were performed, except that, unlike in the above Example 2, the sodium bisulfite was replaced with tricalcium phosphate (manufactured by Wako Pure Chemical Co., INC./Japanese food additives). Thus, a comparative water absorbent agent (3) was obtained. The various physical properties of the obtained comparative water absorbent agent (3) are indicated in Table 3.

Comparative Example 4

The same operations as those in Example 1 were performed, except that, unlike in the above Example 1, the sodium bisulfite was replaced with zinc oxide (manufactured by KISHIDA CHEMICAL Co., INC./guaranteed reagent). Thus, a comparative water absorbent agent (4) was obtained. The various physical properties of the obtained comparative water absorbent agent (4) are indicated in Table 3.

Comparative Example 5

An attempt was made to control dust by adding water with reference to Patent Literatures 1 and 2. However, when 10% of water was added, partial aggregation of the water-absorbent resin was observed, and a water absorption capacity of the water absorbent agent was decreased by 10% correspondingly to the (10% of) added water.

Comparative Example 6

An attempt was made to control dust by using a surfactant with reference to Patent Literatures 3 to 6. However, by the addition of the surfactant, the surface tension of the water-absorbent resin was decreased to be not higher than 60 N/m. Decrease in the surface tension leads to increase in a return amount in a diaper.

Comparative Example 7

An attempt was made to control dust by using a polyalkylene glycol with reference to Patent Literature 8. However, by the addition of the polyalkylene glycol, the surface tension of the water-absorbent resin was decreased to be not higher than 60 N/m. Decrease in the surface tension leads to increase in a return amount in a diaper.

Measurement methods for the physical properties in the tables are as follows. If, for example, the measurement target is a pre-surface-crosslinking water-absorbent resin, the measurement methods apply while the "water absorbent agent" in the following description is replaced with the "pre-surface-crosslinking water-absorbent resin".

[Moisture Content]

The moisture content of each water absorbent agent according to the present invention was measured according to the EDANA method (WSP230.3 (10)). In the present invention, out of the measurement conditions defined in WSP230.3 (10), the amount of the water absorbent agent as a sample was changed to 1.0 g and the drying temperature was changed to 180° C., for the measurement. A value calculated by "100–moisture content (% by mass)" was used as the solid content (unit: % by mass) of the water absorbent agent.

[Mass-Average Particle Diameter D50]

The mass-average particle diameter D50 of each water absorbent agent according to the present invention was measured according to a measurement method described in U.S. Pat. No. 7,638,570.

Meanwhile, the mass-average particle diameter D50 of each crosslinked polymer in the form of a particulate hydrous gel was measured according to the following method.

That is, 500 g of a 20%-by-mass aqueous solution of sodium chloride (hereinafter, referred to as an "EMAL aqueous solution") containing 0.08% by mass of a surfactant (EMAL 20C manufactured by Kao Corporation) was poured into a cylindrical container (8 cm (diameter)×21 cm (height)) made from polypropylene and having a volume of 1 L. 20 g of the particulate hydrous gel (temperature: not lower than 20° C. and not higher than 25° C.) having a solid content of a % by mass was added to the EMAL aqueous solution.

Subsequently, the above EMAL aqueous solution was stirred for 60 minutes at 300 rpm by using a stirrer tip (7 mm (diameter)×50 mm (length)), whereby a dispersion liquid was obtained.

After the end of the above stirring, JIS standard sieves (specifically, sieves having diameters of 21 cm and mesh opening sizes of 8 mm/4 mm/2 mm/1 mm/0.60 mm/0.30 mm/0.15 mm/0.075 mm) disposed on a rotary table were used, and the above dispersion liquid was poured onto a center portion of the sieves. Further, 100 g of the EMAL aqueous solution was used to wash, onto the sieves, the entire particulate hydrous gel remaining in the above cylindrical container.

Then, while the above sieves were rotated by hand (specifically, rotated at 20 rpm), 6000 g of the EMAL aqueous solution was uniformly poured from a height of 30 cm by using a shower nozzle (the number of holes: 72, liquid rate: 6.0 L/min), such that the pouring range (50 cm²) covered the entire sieves. Thus, the particulate hydrous gel was classified.

After the above operation, the particulate hydrous gel remaining on each sieve was drained for about 2 minutes and weighed. Then, from the mass of the particulate hydrous gel remaining on each sieve, the percentage by mass of the particulate hydrous gel was calculated on the basis of the following expressions (4) and (5).

$$X=(w/W)\times 100 \quad \text{expression (4)}$$

$$R(a)=(20/W)^{\wedge}(1/3)\times r \quad \text{expression (5)}$$

Here,

X: the percentage by mass (unit: % by mass) of the particulate hydrous gel remaining on each sieve after the classification and the drainage, w: the mass (unit: g) of the particulate hydrous gel remaining on each sieve after the classification and the drainage, W: the total mass (unit: g) of the particulate hydrous gels remaining on the respective sieves after the classification and the drainage, R(a): the mesh opening size (unit: mm) of a sieve in terms of a particulate hydrous gel having a solid content of a % by mass, and r: the mesh opening size (unit: mm) of a sieve with which the particulate hydrous gel swollen in the 20%-by-mass aqueous solution of sodium chloride was classified.

[Logarithmic Standard Deviation σζ of Particle Size Distribution]

The logarithmic standard deviation σζ of a particle size distribution of each water absorbent agent according to the present invention was measured according to a measurement method described in U.S. Pat. No. 7,638,570.

The logarithmic standard deviation σζ of a particle size distribution of each crosslinked polymer in the form of a particulate hydrous gel was obtained by plotting, on a logarithmic probability paper, results (particle size distribution) of measurement performed by the same method as that for the above [Mass-Average Particle Diameter D50].

A particle diameter at which cumulative sieve % R=84.1% by mass was satisfied (this is defined as X1), and a particle diameter at which cumulative sieve % R=15.9% by mass was satisfied (this is defined as X2), were obtained on the above plot, and a logarithmic standard deviation σζ was calculated on the basis of the following (expression 6). A smaller value of σζ means a narrower particle size distribution.

$$\text{Logarithmic standard deviation}\sigma\zeta=0.5\times \ln(X2/X1) \quad \text{(expression 6)}$$

[Specific Surface Area]

The specific surface area of each water absorbent agent according to the present invention is a value obtained by analyzing, with high-speed three-dimensional analyzing software (TRI/3D-VOL-FCS64 manufactured by Ratoc System Engineering Co., Ltd.), three-dimensional image data of the water absorbent agent acquired by using a micro-focus X-ray CT system (inspeXio SMX-100CT manufactured by Shimadzu Corporation).

Specifically, first, 1 g of the water absorbent agent was put into a lidded columnar container made of plastic and having an inner diameter of about 1 cm and a height of about 5 cm, and the columnar container was sufficiently shaken such that there was no unevenness in particle size. Subsequently, a double-coated adhesive tape was pasted on the bottom surface of the above columnar container, and the columnar container was fixed on a sample mount of the above microfocus X-ray CT system. Then, three-dimensional image data was acquired under the conditions in the following Table 4.

TABLE 2

| | |
|---|---|
| X-ray tube voltage (kV): 50 | Number of views: 1200 |
| X-ray tube current (μA): 40 | Average number: 5 |
| Size in inch (inch): 4.0 | Number of times of multi-rotation: not available |
| X-ray filter: not available | |
| SDD (mm): 500 | Smoothing: YZ |
| SRD (mm): 40 | Slice thickness (mm): 0.008 |
| Z (mm): 108 | Inter-slice distance (mm): 0.010 |
| X (mm): 0 | Scaling coefficient: 50 |
| Y (mm): 0 | BHC data: not available |
| CT mode 1: CBCT | Accurate mode: available |
| CT mode 2: normal scan | FOV XY (mm): 5.0 |
| Scan angle: full scan | FOV Z (mm): 4.0 |
| | Size in voxel (mm/voxel): 0.010 |

Subsequently, analysis was performed according to the following procedure by using the above high-speed three-dimensional analyzing software.

1. From the menu field, Particle Measurement>3D Particle>Particle Separation>Large Particle Separation was selected.
2. L-W was selected in the Binarize tab on the EVC panel, the value of L was changed from an initial value thereof to a value larger than the initial value by 1 with the value of W being kept as an initial value thereof, and a circular measurement target region was extracted. Subsequently, this process was applied to all slice images. Image data extracted by this operation is defined as (A).
3. L-W was selected in the Binarize tab on the EVC panel, the value of L was changed from the initial value to 37580 with the value of W being kept as the initial value, and all the particles in the measurement target region were extracted. Subsequently, this process was applied to all the slice images. Particle image data extracted by this operation is defined as (B).
4. First, in the Binary tab on the EVC panel, Ers Sml was selected, and particles having particle sizes not larger than 10 voxels and considered as noises were erased on the basis of the particle image data (B). Subsequently, Invert was selected in the Binary tab on the EVC panel, to cause inversion between the region in which particles were extracted and the region in which no particles were extracted. Subsequently, Ers Sml was selected, and particles having particle sizes not larger than 10 voxels and considered as noises were erased. Subsequently, in the 3D tab on the EVC panel, Labeling was selected, and further, Volume and Max were selected so that only a region with the largest volume was extracted. Lastly, Invert was selected again in the Binary tab on the EVC panel so that, in the measurement target region, noises were erased and all the particles were extracted in a void-filled state. Particle image data extracted by these operations is defined as (C). The void mentioned herein refers to a cavity that is present inside the water-absorbent resin and that is not in contact with the outside.
5. In the L Op tab (inter-channel logical computation process), the particle image data (B) was subtracted from the particle image data (C). Then, in the Binary tab on the EVC panel, Ers Sml was selected, and particles having particle sizes not larger than 10 voxels and considered as noises were erased so that voids were extracted.

6. On the basis of the particle image data (C), Small Particle Extraction was selected on a large particle separation panel (Large Particle Extraction was not selected), each of Constriction Proportion, Repair Filter Size, and Repair Mrg Sml Diameter was set to 0, and separation and color sorting for particles were performed.
7. In the 3D tab on the EVC panel, Labeling was selected, and further, Coordinate Value (Cycle) was selected and Fine Particle Size was set to 10, to perform a separation operation for particles.
8. From the menu field, Particle Measurement>Voids among 3D Particles>Post-Separation Measurement was selected. Subsequently, a calculation process was performed on the Post-Separation Measurement panel while the unit was set to voxel, edge particles were set to be erased, Surface Area Calculation and Void Calculation were selected as measurement items, and the image data (A) extracted by the operation in the above item 2 was selected as a measurement ROI to be specified. By the above operations, the total surface area of all the particles (unit: $mm^2$), the nominal total volume of all the particles (unit: $mm^3$), and the total volume of the voids (unit: $mm^3$) in the measurement target region, were calculated. The nominal total volume refers to the total volume of all particles calculated by assuming that no voids are present among the particles. While the values obtained through the above image analysis were used and the true density of the water absorbent agent was set to 1.7 $g/cm^3$, the specific surface area of the water absorbent agent was calculated from the following expression.

Specific surface area($m^2$/kg)=total surface area of all particles($mm^2$)/((nominal total volume of all particles($mm^3$)−total volume of voids($mm^3$))× 1.7(g/$cm^3$)

[Dust Amount]

According to description in paragraphs [0281] and [0282] of International Publication No. 2006/098271, the dust amount of each water absorbent agent according to the present invention was measured from an increase in the mass of dust sucked and captured with a glass fiber filter paper during a predetermined time under the following conditions. The measurement was performed under measurement condition Type II by using, as a measurement device, a Heubach DUSTMETER manufactured by Heubach Engineering GmbH of Germany. In addition, the measurement was performed at normal pressure while, during the measurement, the temperature of an atmosphere was 23° C. (±2° C.) and the relative humidity was not lower than 20% and not higher than 40%. The measurement was performed according to the following steps (1) to (6).

(1) 50.00 g of the water absorbent agent was put as a measurement sample onto a rotary drum.
(2) The mass (represented by Da[g]) of a glass fiber filter paper (GLASS FIBER GC-90 manufactured by ADVANTEC or a product equivalent thereto processed to have a diameter of 50 mm) having a retained particle diameter of 0.5 μm (JIS P3801) and a diameter of 50 mm, was measured to the unit of 0.00001 g.
(3) A large-sized particle separation machine was attached to the rotary drum, and a filter case mounted with the glass fiber filter paper was attached to the large-sized particle separation machine.
(4) Measurement was performed with measurement conditions of a control unit of the Heubach DUSTMETER being set as follows.

Drum rotation rate: 30 rpm

Suction air flow rate: 4 L/minute

Measurement time: 30 minutes (5) After the elapse of the predetermined time, the mass (represented by Db[g]) of the glass fiber filter paper was measured to the unit of 0.00001 g.
(6) A dust amount was calculated according to the following (expression 7) by using the above Da[g] and the above Db[g].

Dust amount(mg/kg)=(Db·Da)/100×1000000 (expression 7)

In addition, the proportion of a dust amount after addition of an inorganic acid alkali metal salt powder to a dust amount before the said addition (post-decrease dust proportion) was calculated according to the following (expression 8).

Proportion of dust amount after addition of inorganic acid alkali metal salt powder(post-decrease dust proportion)(%)=dust amount after said addition (mg/kg)/dust amount before said addition(mg/ kg)×100 (expression 8)

[Post-Prompting-Test Coloring Degree (Coloring Over Time)]

The post-prompting-test coloring degree of each water absorbent agent according to the present invention can be checked by measuring, with use of a spectral color difference meter, the L-value (lightness) on the Hunter Lab color system of the water absorbent agent having been exposed to an atmosphere of 70±1° C. and a relative humidity of 75±1% for 7 days.

Specifically, a lidded plastic dish (inner diameter: 90 mm, depth: about 12 mm) filled with 13 g of the water-absorbent resin composition was put into a constant-temperature and constant-humidity machine (small-sized environment tester of a model SH-641 manufactured by ESPEC CORP.) adjusted to the above atmosphere, and was left at rest for 7 days. Then, measurement was performed with use of a spectral color difference meter (type: LabScanXE) manufactured by Hunter Associates Laboratory, Inc. In reflection measurement, a white standard plate provided to the LabScanEX was used as a standard, and a provided sample support was used. On the provided sample support, the water-absorbent resin composition in a sheet form after the above prompting test was measured for surface colors (L, a, b) with use of the above spectral color difference meter under a condition of room temperature (temperature: 20 to 25° C.) and a humidity of 50% RH.

TABLE 3

| | | | Additive | | |
|---|---|---|---|---|---|
| | | | | Particle diameter μm | Addition amount parts by mass |
| Example 1 | Post-surface-crosslinking water-absorbent resin (1) | Water absorbent agent (1) | Sodium bisulfite | 104 | 0.5 |
| Example 2 | Post-surface-crosslinking water-absorbent resin (1) | Water absorbent agent (2) | Sodium bisulfite | 104 | 1.0 |
| Example 3 | Post-surface-crosslinking water-absorbent resin (3) | Water absorbent agent (3) | Sodium bisulfite | 104 | 1.0 |
| Example 4 | Post-surface-crosslinking water-absorbent resin (2) | Water absorbent agent (4) | Sodium bisulfite | 104 | 0.5 |
| Example 5 | Post-surface-crosslinking water-absorbent resin (1) | Water absorbent agent (5) | Sodium sulfite | 100 | 1.0 |
| Example 6 | Post-surface-crosslinking water-absorbent resin (1) | Water absorbent agent (6) | Sodium sulfate | — | 0.5 |
| Example 7 | Post-surface-crosslinking water-absorbent resin (1) | Water absorbent agent (7) | Sodium thiosulfate pentahydrate | — | 0.5 |
| Example 8 | Post-surface-crosslinking water-absorbent resin (1) | Water absorbent agent (8) | Sodium carbonate | 49 | 0.5 |
| Example 9 | Post-surface-crosslinking water-absorbent resin (2) | Water absorbent agent (9) | Sodium carbonate | 49 | 1.0 |
| Example 10 | Post-surface-crosslinking water-absorbent resin (1) | Water absorbent agent (10) | Sodium bicarbonate | 106 | 1.0 |
| Example 11 | Post-surface-crosslinking water-absorbent resin (2) | Water absorbent agent (11) | Sodium bicarbonate | 106 | 1.0 |
| Example 12 | Post-surface-crosslinking water-absorbent resin (1) | Water absorbent agent (12) | Sodium carbonate/ Sodium bicarbonate | — | 0.279/0.221 |
| Example 13 | Post-surface-crosslinking water-absorbent resin (1) | Water absorbent agent (13) | Anhydrous dibasic sodium phosphate | — | 0.5 |
| Example 14 | Post-surface-crosslinking water-absorbent resin (1) | Water absorbent agent (14) | Potassium carbonate | — | 0.5 |
| Example 15 | Post-surface-crosslinking water-absorbent resin (1) | Water absorbent agent (15) | Potassium chloride | — | 0.5 |
| Example 16 | Post-surface-crosslinking water-absorbent resin (1) | Water absorbent agent (16) | Potassium sulfate | — | 0.5 |
| Example 17 | Post-surface-crosslinking water-absorbent resin (1) | Water absorbent agent (17) | Lithium carbonate | — | 0.5 |
| Comparative Example 1 | Post-surface-crosslinking water-absorbent resin (1) | Comparative water absorbent agent (1) | Barium sulfate | — | 0.5 |
| Comparative Example 2 | Post-surface-crosslinking water-absorbent resin (1) | Comparative water absorbent agent (2) | (Anhydrous) magnesium sulfate | — | 0.5 |
| Comparative Example 3 | Post-surface-crosslinking water-absorbent resin (1) | Comparative water absorbent agent (3) | Tricalcium phosphate | — | 1.0 |
| Comparative Example 4 | Post-surface-crosslinking water-absorbent resin (1) | Comparative water absorbent agent (4) | Zinc oxide | 2 | 0.5 |

| | Powder dust amount | | | | | |
|---|---|---|---|---|---|---|
| | Before addition of additive mg/kg | After addition of additive mg/kg | Post-decrease dust proportion % | Moisture content parts by mass | Proportion of particles smaller than 150 μm % | Specific surface area m$^2$/kg |
| Example 1 | 131 | 114 | 87 | 3.3 | 0.9 | 32.5 |
| Example 2 | 131 | 105 | 80 | 3.3 | 1.2 | 35.3 |
| Example 3 | 136 | 92 | 68 | 4.0 | 0.6 | 32.3 |
| Example 4 | 145 | 122 | 84 | 3.5 | 1.2 | 34.1 |
| Example 5 | 131 | 113 | 86 | 3.3 | 1.2 | 31.4 |
| Example 6 | 131 | 105 | 80 | 3.3 | 1.0 | 32.2 |
| Example 7 | 131 | 118 | 90 | 3.5 | 1.2 | 32.6 |
| Example 8 | 131 | 77 | 59 | 3.3 | 0.9 | 32.2 |
| Example 9 | 145 | 93 | 64 | 3.5 | 1.3 | 33.3 |
| Example 10 | 131 | 128 | 98 | 3.3 | 1.3 | 35.1 |
| Example 11 | 145 | 101 | 70 | 3.5 | 1.5 | 35.9 |
| Example 12 | 131 | 62 | 47 | 3.3 | 0.8 | 32.2 |
| Example 13 | 131 | 127 | 97 | 3.3 | 1.2 | 32.2 |
| Example 14 | 131 | 67 | 51 | 3.3 | 0.9 | 32.1 |
| Example 15 | 131 | 59 | 45 | 3.3 | 0.8 | 32.0 |
| Example 16 | 131 | 54 | 41 | 3.3 | 0.9 | 32.1 |
| Example 17 | 131 | 108 | 82 | 3.3 | 1.1 | 32.6 |
| Comparative Example 1 | 131 | 177 | 135 | 3.3 | 1.3 | 33.0 |
| Comparative Example 2 | 131 | 339 | 259 | 3.3 | 1.4 | 34.1 |
| Comparative Example 3 | 131 | 869 | 663 | 3.3 | 1.7 | 36.2 |

TABLE 3-continued

| | | | | | | |
|---|---|---|---|---|---|---|
| Comparative Example 4 | 131 | 206 | 157 | 3.3 | 1.2 | 34.5 |

(Conclusion)

As indicated in Table 3, in each of the cases (Examples 1 to 17) of adding the inorganic acid alkali metal salt powders to the water-absorbent resins, the dust amount was decreased by up to half the dust amount before addition of the inorganic acid alkali metal salt powder even though the inorganic acid alkali metal salt powder was further added to the water-absorbent resin.

Meanwhile, as indicated in each of Comparative Examples 1 to 4 in which additive powders other than inorganic acid alkali metal salt powders were added, the dust amount was increased 1.35 times to 6.63 times. In this manner, an effect of decreasing the dust generation amount is obtained only if an inorganic acid alkali metal salt powder is added. Ordinarily, suppression of dust is achieved by adding a liquid to a water-absorbent resin. Considering this, the effect of the present invention differs from that of a conventional case in that the same advantageous effect as that in the case of adding a liquid additive, i.e., an additive solution, is obtained even though the additive is a powder. Addition of the inorganic acid alkali metal salt powders is particularly advantageous in that, as compared to the case of adding an additive solution, the moisture content of the water-absorbent resin can be maintained at a low value so that the absorption performance does not decrease.

In addition, in the producing method of the present invention, the effect of decreasing the dust generation amount is obtained also if an inorganic acid alkali metal salt powder is added to any of water-absorbent resins having been subjected to surface-crosslinking treatment and water-absorbent resins having been further treated with Al or the like after surface-crosslinking treatment. Therefore, the producing method is advantageous in that the step of performing the addition is not limited to any particular step and thus there are many choices regarding production conditions.

The invention claimed is:

1. A method for producing a water absorbent agent comprising:
mixing an inorganic acid alkali metal salt powder with a water-absorbent resin, wherein
a mixing amount of the inorganic acid alkali metal salt powder is not lower than 0.5 parts by mass and not higher than 1 part by mass relative to 100 parts by mass of the water-absorbent resin in an indefinite ground form;
wherein the inorganic acid alkali metal salt powder is at least one type selected from the group consisting of sodium sulfite, sodium bisulfite, sodium sulfate, sodium thiosulfate, sodium carbonate, sodium bicarbonate, sodium phosphate, potassium carbonate, potassium chloride, potassium sulfate, and lithium carbonate; and
the surface of the water absorbent agent is disposed of the inorganic acid alkali metal salt powder, wherein the specific surface area of the water absorbent agent is not lower than 25 m$^2$/kg and proportion of particles of the water-absorbent resin that pass through sieve having mesh opening size of 150 μm to entire water absorbent agent is not higher than 3% by mass.

2. The method for producing the water absorbent agent according to claim 1, wherein moisture content of the water-absorbent resin is not higher than 10% by mass.

3. The method for producing the water absorbent agent according to claim 1, wherein
the water-absorbent resin is a polyacrylic acid (salt)-based water-absorbent resin obtained by performing foaming polymerization on a monomer aqueous solution containing an acrylic acid (salt) as a main component.

4. The method for producing the water absorbent agent according to claim 1, wherein
the water-absorbent resin is a polyacrylic acid (salt)-based water-absorbent resin obtained through a step of performing gel grinding, at a gel grinding energy 2 not lower than 7 J/g and not higher than 40 J/g, on a crosslinked polymer in the form of a hydrous gel which is obtained simultaneously with or after polymerization of a monomer aqueous solution containing an acrylic acid (salt) as a main component.

5. The method for producing the water absorbent agent according to claim 1, wherein
the water-absorbent resin is a polyacrylic acid (salt)-based water-absorbent resin obtained through a step of granulating a crosslinked polymer in the form of a hydrous gel or a dried substance thereof, the crosslinked polymer having been obtained simultaneously with or after polymerization of a monomer aqueous solution containing an acrylic acid (salt) as a main component.

6. The method for producing the water absorbent agent according to claim 1, wherein
the water-absorbent resin is further added a liquid permeability improver.

7. The method for producing the water absorbent agent according to claim 1, wherein
a post-decrease dust proportion defined by a dust amount after addition of the inorganic acid alkali metal salt powder with respect to a dust amount before addition of the inorganic acid alkali metal salt powder, is lower than 100%.

8. The method for producing the water absorbent agent according to claim 1, wherein
the water-absorbent resin is surface crosslinked by at least one type of organic surface-crosslinking agent selected from the group consisting of polyhydric alcohol compounds, amino alcohols, alkylene carbonate compounds, oxazolidinone compounds, and epoxy compounds.

9. The method for producing the water absorbent agent according to claim 1, wherein
a mass-average particle diameter D50 of the inorganic acid alkali metal salt powder is not larger than 200 μm.

10. A water absorbent agent containing the surface-crosslinked water-absorbent resin in an indefinite ground form as a main component, wherein
a surface of the water absorbent agent is disposed of an inorganic acid alkali metal salt powder, wherein
specific surface area of the water absorbent agent is not lower than 25 m$^2$/kg and proportion of particles of the water-absorbent resin that pass through sieve having mesh opening size of 150 μm to entire water absorbent agent is not higher than 3% by mass, wherein the inorganic acid alkali metal salt powder is at least one type selected from the group consisting of sodium sulfite, sodium bisulfite, sodium sulfate, sodium thiosulfate, sodium carbonate, sodium bicarbonate, sodium phosphate, potassium carbonate, potassium chloride, potassium sulfate, and lithium carbonate; and wherein the content of the inorganic acid alkali metal salt powder of the water absorbent agent relative to 100 parts by mass of the water absorbent agent is not lower than 0.5 parts by mass and not higher than 1 part by mass.

11. The water absorbent agent according to claim 10, wherein moisture content of the water absorbent agent is not higher than 10% by mass.

12. The water absorbent agent according to claim 10, wherein a total amount of the polyhydric alcohols in the water absorbent agent is not lower than 100 ppm and not higher than 15000 ppm on a mass basis.

13. The water absorbent agent according to claim 10, wherein a post-prompting-test coloring degree of the water absorbent agent is not smaller than 80 in terms of L-value.

14. The water absorbent agent according to claim 10, wherein a dust amount of the water absorbent agent is not higher than 150 mg/kg, that is defined by a 30-minute value obtained with a Heubach DUSTMETER.

15. The water absorbent agent according to claim 10, wherein a mass-average particle diameter D50 of the inorganic acid alkali metal salt powder is not larger than 200 μm.

* * * * *